(12) United States Patent
Arise et al.

(10) Patent No.: US 10,957,941 B2
(45) Date of Patent: *Mar. 23, 2021

(54) NONAQUEOUS ELECTROLYTE SECONDARY BATTERY

(71) Applicant: Sumitomo Chemical Company, Limited, Tokyo (JP)

(72) Inventors: Ichiro Arise, Osaka (JP); Toshihiko Ogata, Osaka (JP); Chikae Yoshimaru, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 152 days.

This patent is subject to a terminal disclaimer.

(21) Appl. No.: 16/225,015

(22) Filed: Dec. 19, 2018

(65) Prior Publication Data

US 2019/0190081 A1 Jun. 20, 2019

(30) Foreign Application Priority Data

Dec. 19, 2017 (JP) .............................. JP2017-243285

(51) Int. Cl.
  H01M 10/0585 (2010.01)
  H01M 10/0525 (2010.01)
  (Continued)

(52) U.S. Cl.
  CPC ......... H01M 10/0585 (2013.01); H01M 2/16 (2013.01); H01M 4/131 (2013.01);
  (Continued)

(58) Field of Classification Search
  CPC .............................. H01M 2/16; H01M 2/1686
  See application file for complete search history.

(56) References Cited

U.S. PATENT DOCUMENTS

| | | |
|---|---|---|
| 3,931,446 A | 1/1976 | Murayama et al. |
| 5,051,183 A | 9/1991 | Takita et al. |
| (Continued) | | |

FOREIGN PATENT DOCUMENTS

| | | |
|---|---|---|
| CN | 1322021 A | 11/2001 |
| CN | 1933923 A | 3/2007 |
| (Continued) | | |

OTHER PUBLICATIONS

Office Action dated Apr. 10, 2018 in JP Application No. 2017243285 (Partial English Translation).

(Continued)

*Primary Examiner* — Amanda C. Walke
(74) *Attorney, Agent, or Firm* — Panitch Schwarze Belisario & Nadel LLP

(57) ABSTRACT

A nonaqueous electrolyte secondary battery which satisfies four requirements is provided. A porous layer contains α-form polyvinylidene fluoride-based resin in an amount of not less than 35.0 mol % with respect to 100 mol % of a total amount of (i) the α-form polyvinylidene fluoride-based resin and (ii) β-form polyvinylidene fluoride-based resin. A porous film has a temperature rise ending period of 2.9 sec·m²/g to 5.7 sec·m²/g with respect to an amount of a resin per unit area when the porous film is impregnated with N-methylpyrrolidone containing water in an amount of 3% by weight and then (ii) irradiated, at an output of 1,800 W, with a microwave having a frequency of 2,455 MHz. A positive electrode plate has a capacitance of 1 nF to 1000 nF per measurement area of 900 mm². A negative electrode plate has a capacitance of 4 nF to 8500 nF per measurement area of 900 mm².

6 Claims, 2 Drawing Sheets

(51) Int. Cl.

| | | |
|---|---|---|
| H01M 10/48 | (2006.01) | |
| H01M 2/16 | (2006.01) | |
| H01M 4/133 | (2010.01) | |
| H01M 4/48 | (2010.01) | |
| H01M 4/583 | (2010.01) | |
| H01M 4/131 | (2010.01) | |
| H01M 10/0564 | (2010.01) | |
| H01M 4/525 | (2010.01) | |

(52) U.S. Cl.
CPC ............ *H01M 4/133* (2013.01); *H01M 4/48* (2013.01); *H01M 4/483* (2013.01); *H01M 4/525* (2013.01); *H01M 4/583* (2013.01); *H01M 10/0525* (2013.01); *H01M 10/0564* (2013.01); *H01M 10/48* (2013.01); *H01M 2300/0025* (2013.01); *H01M 2300/0094* (2013.01)

(56) References Cited

U.S. PATENT DOCUMENTS

| | | |
|---|---|---|
| 5,571,634 A | 11/1996 | Gozdz et al. |
| 6,395,419 B1 | 5/2002 | Kuwahara et al. |
| 7,208,555 B2 | 4/2007 | Tada et al. |
| 7,255,957 B2 | 8/2007 | Takahashi et al. |
| 8,931,647 B2 * | 1/2015 | Shiki ............... C08J 5/18 210/500.42 |
| 9,508,975 B1 | 11/2016 | Matsuo |
| 9,876,210 B2 | 1/2018 | Ogata et al. |
| 10,074,840 B2 | 9/2018 | Honda et al. |
| 10,319,973 B2 | 6/2019 | Ogata et al. |
| 10,361,418 B2 | 7/2019 | Ogata et al. |
| 10,361,458 B2 | 7/2019 | Ogata et al. |
| 10,367,182 B2 | 7/2019 | Ogata et al. |
| 10,388,932 B2 | 8/2019 | Ogata et al. |
| 10,461,297 B2 | 10/2019 | Ogata et al. |
| 10,707,517 B2 * | 7/2020 | Arise ............... H01M 2/1686 |
| 2002/0018936 A1 | 2/2002 | Suzuki et al. |
| 2002/0136887 A1 | 9/2002 | Penneau et al. |
| 2003/0157314 A1 | 8/2003 | Penneau et al. |
| 2003/0175494 A1 | 9/2003 | Penneau et al. |
| 2006/0014912 A1 | 1/2006 | Araki et al. |
| 2007/0072069 A1 | 3/2007 | Yamada et al. |
| 2007/0092705 A1 | 4/2007 | Lee et al. |
| 2007/0190334 A1 | 8/2007 | Araki et al. |
| 2007/0232709 A1 | 10/2007 | Lee et al. |
| 2009/0101600 A1 | 4/2009 | Shiki et al. |
| 2009/0111025 A1 | 4/2009 | Lee et al. |
| 2009/0148659 A1 | 6/2009 | Ishiodori et al. |
| 2009/0200509 A1 | 8/2009 | Suzuki et al. |
| 2010/0123096 A1 | 5/2010 | Suzuki |
| 2010/0167125 A1 | 7/2010 | Miyaki et al. |
| 2010/0285341 A1 | 11/2010 | Yun et al. |
| 2011/0027660 A1 | 2/2011 | Takeda et al. |
| 2011/0212358 A1 | 9/2011 | Usami et al. |
| 2011/0305940 A1 | 12/2011 | Usami et al. |
| 2012/0028101 A1 | 2/2012 | Ishihara et al. |
| 2012/0028102 A1 | 2/2012 | Ishihara et al. |
| 2012/0028131 A1 | 2/2012 | Ishihara et al. |
| 2012/0034518 A1 | 2/2012 | Ishihara et al. |
| 2012/0034519 A1 | 2/2012 | Ishihara et al. |
| 2012/0040232 A1 | 2/2012 | Ishihara et al. |
| 2012/0135305 A1 * | 5/2012 | Kim ............... H01M 4/1391 429/211 |
| 2012/0268072 A1 | 10/2012 | Okuno |
| 2012/0308898 A1 | 12/2012 | Sawamoto et al. |
| 2013/0071743 A1 | 3/2013 | Miyaki et al. |
| 2013/0089770 A1 | 4/2013 | Nishikawa |
| 2013/0095365 A1 | 4/2013 | Nishikawa |
| 2013/0164618 A1 | 6/2013 | Konishi |
| 2013/0196208 A1 | 8/2013 | Nemoto |
| 2013/0266831 A1 | 10/2013 | Motohashi et al. |
| 2013/0337311 A1 | 12/2013 | Itou |
| 2014/0178741 A1 | 6/2014 | Hasegawa et al. |
| 2014/0272505 A1 | 9/2014 | Yoon et al. |
| 2014/0363726 A1 | 12/2014 | Honda et al. |
| 2015/0093647 A1 * | 4/2015 | Kako ............... H01M 4/505 429/223 |
| 2015/0155541 A1 | 6/2015 | Hasegawa |
| 2015/0180002 A1 | 6/2015 | Nishikawa et al. |
| 2015/0188108 A1 | 7/2015 | Miyazawa et al. |
| 2015/0236323 A1 | 8/2015 | Honda et al. |
| 2015/0263325 A1 | 9/2015 | Honda et al. |
| 2015/0280194 A1 | 10/2015 | Mitsuoka et al. |
| 2015/0372276 A1 | 12/2015 | Mizuno et al. |
| 2016/0118639 A1 | 4/2016 | Ishihara |
| 2016/0181593 A1 | 6/2016 | Jin et al. |
| 2016/0268571 A1 | 9/2016 | Honda |
| 2017/0012265 A1 | 1/2017 | Nakadate et al. |
| 2017/0033347 A1 | 2/2017 | Murakami et al. |
| 2017/0033348 A1 | 2/2017 | Murakami et al. |
| 2017/0098809 A1 * | 4/2017 | Ogata ............... H01M 2/1653 |
| 2017/0141373 A1 | 5/2017 | Murakami et al. |
| 2017/0155113 A1 * | 6/2017 | Hashiwaki .......... H01M 2/1686 |
| 2017/0155114 A1 | 6/2017 | Kurakane |
| 2017/0155120 A1 | 6/2017 | Yoshimaru et al. |
| 2017/0155121 A1 | 6/2017 | Ogata |
| 2017/0162849 A1 | 6/2017 | Murakami et al. |
| 2017/0170443 A1 | 6/2017 | Murakami et al. |
| 2017/0263905 A1 | 9/2017 | Ogata et al. |
| 2017/0279102 A1 | 9/2017 | Hasegawa et al. |
| 2017/0341035 A1 | 11/2017 | Sato et al. |
| 2017/0365831 A1 | 12/2017 | Ogata et al. |
| 2017/0365832 A1 | 12/2017 | Ogata et al. |
| 2017/0365833 A1 | 12/2017 | Ogata et al. |
| 2017/0365834 A1 | 12/2017 | Ogata et al. |
| 2017/0365835 A1 | 12/2017 | Ogata et al. |
| 2017/0365836 A1 | 12/2017 | Ogata et al. |
| 2017/0365878 A1 | 12/2017 | Ogata et al. |
| 2018/0083249 A1 | 3/2018 | Hasegawa et al. |
| 2018/0261878 A1 * | 9/2018 | Azami ............... H01M 4/661 |
| 2018/0301740 A1 * | 10/2018 | Min ............... H01M 4/131 |
| 2018/0342720 A1 | 11/2018 | Kurakane |
| 2019/0074539 A1 * | 3/2019 | Shen ............... H01M 4/626 |
| 2019/0189993 A1 | 6/2019 | Arise et al. |
| 2019/0190037 A1 * | 6/2019 | Mizuno ............... H01M 2/16 |
| 2019/0334149 A1 * | 10/2019 | Li ............... H01M 2/1653 |
| 2019/0386274 A1 * | 12/2019 | Wood ............... H01M 2/145 |
| 2019/0393466 A1 * | 12/2019 | Lin ............... H01M 2/1653 |
| 2020/0052269 A1 * | 2/2020 | Taguchi ............... H01M 2/145 |
| 2020/0070470 A1 | 3/2020 | Yoshimaru et al. |

FOREIGN PATENT DOCUMENTS

| | | |
|---|---|---|
| CN | 101500696 A | 8/2009 |
| CN | 101983219 A | 3/2011 |
| CN | 102651466 A | 8/2012 |
| CN | 103155219 A | 6/2013 |
| CN | 104205177 A | 9/2014 |
| EP | 0834941 A1 | 4/1998 |
| JP | S51017274 A | 2/1976 |
| JP | H06104736 B2 | 12/1994 |
| JP | H9161778 A | 6/1997 |
| JP | H11016561 A | 1/1999 |
| JP | H11040129 A | 2/1999 |
| JP | H1186844 A | 3/1999 |
| JP | H11120994 A | 4/1999 |
| JP | H11130900 A | 5/1999 |
| JP | H11300180 A | 11/1999 |
| JP | 2001118558 A | 4/2001 |
| JP | 2001351616 A | 12/2001 |
| JP | 2004087209 A | 3/2004 |
| JP | 2005135659 A | 5/2005 |
| JP | 2005179562 A | 7/2005 |
| JP | 2005200623 A | 7/2005 |
| JP | 2005222773 A | 8/2005 |
| JP | 2005343957 A | 12/2005 |
| JP | 200666243 A | 3/2006 |
| JP | 2007048581 A | 2/2007 |
| JP | 2008062229 A | 3/2008 |
| JP | 2008123996 A | 5/2008 |
| JP | 4247027 B2 | 4/2009 |
| JP | 2009104967 A | 5/2009 |

(56) References Cited

FOREIGN PATENT DOCUMENTS

| | | |
|---|---|---|
| JP | 2009185093 A | 8/2009 |
| JP | 2009218198 A | 9/2009 |
| JP | 2009256404 A | 11/2009 |
| JP | 2009259605 A | 11/2009 |
| JP | 2010118312 A | 5/2010 |
| JP | 2010157361 A | 7/2010 |
| JP | 2010232088 A | 10/2010 |
| JP | 2010540744 A | 12/2010 |
| JP | 2011077014 A | 4/2011 |
| JP | 201276255 A | 4/2012 |
| JP | 2012104422 A | 5/2012 |
| JP | 2012150972 A | 8/2012 |
| JP | 5085581 B2 | 11/2012 |
| JP | 2012227066 A | 11/2012 |
| JP | 2012256528 A | 12/2012 |
| JP | 5164296 B2 | 3/2013 |
| JP | 2013046998 A | 3/2013 |
| JP | 2013171629 A | 9/2013 |
| JP | 5302456 B1 | 10/2013 |
| JP | 2013218875 A | 10/2013 |
| JP | 5355823 B1 | 11/2013 |
| JP | 2013234263 A | 11/2013 |
| JP | 5432417 B2 | 3/2014 |
| JP | 5553165 B2 | 7/2014 |
| JP | 2014213500 A | 11/2014 |
| JP | 2015111461 A | 6/2015 |
| JP | 2015120835 A | 7/2015 |
| JP | 2015122234 A | 7/2015 |
| JP | 5876616 B1 | 3/2016 |
| JP | 2016040354 A | 3/2016 |
| JP | 2016051695 A | 4/2016 |
| JP | 2016066755 A | 4/2016 |
| JP | 201671969 A | 5/2016 |
| JP | 5932161 B1 | 6/2016 |
| JP | 6012838 B1 | 10/2016 |
| JP | 6025957 B1 | 11/2016 |
| JP | 6153992 B2 | 6/2017 |
| JP | 2017103041 A | 6/2017 |
| JP | 2017103042 A | 6/2017 |
| JP | 2017103046 A | 6/2017 |
| JP | 2017103204 A | 6/2017 |
| JP | 2017103209 A | 6/2017 |
| JP | 2017107848 A | 6/2017 |
| JP | 2017142917 A | 8/2017 |
| JP | 2017168419 A | 9/2017 |
| JP | 2017226117 A | 12/2017 |
| JP | 2017226120 A | 12/2017 |
| JP | 2017226121 A | 12/2017 |
| JP | 2017226122 A | 12/2017 |
| JP | 2017228404 A | 12/2017 |
| KR | 20060072065 A | 6/2006 |
| KR | 20060101541 A | 9/2006 |
| KR | 20060118668 A | 11/2006 |
| KR | 20090037552 A | 4/2009 |
| KR | 20120003864 A | 1/2012 |
| KR | 20120128612 A | 11/2012 |
| KR | 20130031319 A | 3/2013 |
| KR | 20130036043 A | 4/2013 |
| KR | 101430975 B1 | 8/2014 |
| KR | 20140112668 A | 9/2014 |
| KR | 20140113186 A | 9/2014 |
| KR | 20140114428 A | 9/2014 |
| KR | 101479749 B1 | 1/2015 |
| KR | 20150020667 A | 2/2015 |
| KR | 20150032555 A | 3/2015 |
| KR | 101510972 B1 | 4/2015 |
| KR | 20150083839 A | 7/2015 |
| KR | 20150119836 A | 10/2015 |
| KR | 20160002173 A | 1/2016 |
| KR | 20160014616 A | 2/2016 |
| KR | 20160016805 A | 2/2016 |
| KR | 20160038918 A | 4/2016 |
| KR | 20160094846 A | 8/2016 |
| KR | 20170031794 A | 3/2017 |
| WO | 9859384 A1 | 12/1998 |
| WO | 2007119850 A1 | 10/2007 |
| WO | 2008018181 A1 | 2/2008 |
| WO | 2010089939 A1 | 8/2010 |
| WO | 2012090632 A1 | 7/2012 |
| WO | 2012137375 A1 | 10/2012 |
| WO | 2013073503 A1 | 5/2013 |
| WO | 2013099539 A1 | 7/2013 |
| WO | 2013133074 A1 | 9/2013 |
| WO | 2015099190 A1 | 7/2015 |
| WO | 2015141477 A1 | 9/2015 |
| WO | 2016104792 A1 | 6/2016 |
| WO | 2016152863 A1 | 9/2016 |

OTHER PUBLICATIONS

Obata, J., "Scratch Tester" Technical Sheet No. 13011, Japan, Technology Research Institute of Osaka Prefecture, p. 1-2 (2013).
Office Action dated Aug. 18, 2020 in JP Application No. 2019108158 (with Partial English Translation).
International Search Report dated Jan. 10, 2017 in International Application No. PCT/JP2016/081481.
Martins et al., "Electroactive Phases of Poly(Vinylidene Fluoride): Determination, Processing, and Applications," Progress in Polymer Science, vol. 39, pp. 683-706 (2014).
Mohammadi et al., "Effect of Tensile Strain Rate and Elongation on Crystalline Structure and Piezoelectric Properties of PVDF Thin Films" Polymer Testing, vol. 26, pp. 42-50 (2007).
Office Action dated Jan. 13, 2020 in U.S. Appl. No. 15/989,901, by Kurakane.
Office Action dated Mar. 12, 2019 in JP Application No. 2017243278 (partial translation).
Office Action dated Mar. 12, 2019 in JP Application No. 2017243282 (Partial Translation).
Office Action dated Mar. 12, 2019 in JP Application No. 2017243286 (Partial English Translation).
Office Action dated Mar. 28, 2018 in CN Application No. 201610865635.7.
Office Action dated Apr. 3, 2018 in JP Application No. 2017243277 (Partial English Translation).
Office Action dated Apr. 3, 2018 in JP Application No. 2017243278 (Partial English Translation).
Office Action dated Apr. 3, 2018 in JP Application No. 2017243280 (Partial English Translation).
Office Action dated Apr. 3, 2018 in JP Application No. 2017243282 (Partial Translation).
Office Action dated Apr. 3, 2018 in JP Application No. 2017243284 (Partial English Translation).
Office Action dated Apr. 3, 2018 in JP Application No. 2017243286 (Partial English Translation).
Office Action dated Apr. 3, 2018 in JP Application No. 2017243289.
Office Action dated Apr. 3, 2018 in JP Application No. 2017243292 (Partial English Translation).
Office Action dated Apr. 10, 2018 in JP Application No. 2017243290 (Partial English Translation).
Office Action dated Apr. 10, 2018 in JP Application No. 2017243293.
Office Action dated Apr. 10, 2019 in U.S. Appl. No. 15/627,585, by Ogata.
Office Action dated Apr. 19, 2017 in KR Application No. 1020160077240.
Office Action dated May 16, 2017 in JP Application No. 2017033720 (Partial English Translation).
Office Action dated Jun. 10, 2020 in U.S. Appl. No. 16/223,737, by Arise.
Office Action dated Jun. 15, 2017 in U.S. Appl. No. 15/398,231, by Ogata.
Office Action dated Jun. 19, 2018 in KR Application No. 1020180060097.
Office Action dated Jun. 28, 2016 in JP Application No. 2016024163 (Partial English Translation).
Office Action dated Jul. 29, 2016 in KR Application No. 1020160077240.
Office Action dated Aug. 4, 2020 in U.S. Appl. No. 16/224,014, by Kashiwazaki.

(56) References Cited

OTHER PUBLICATIONS

Office Action dated Aug. 4, 2020 in U.S. Appl. No. 16/224,111, by Arise.
Office Action dated Aug. 6, 2020 in U.S. Appl. No. 16/224,785, by Kurkane.
Office Action dated Aug. 13, 2020 in U.S. Appl. No. 16/224,788, by Arise.
Office Action dated Aug. 18, 2017 in KR Application No. 1020170041366.
Office Action dated Aug. 18, 2017 in KR Application No. 1020170041590.
Office Action dated Aug. 18, 2017 in KR Application No. 1020170041595.
Office Action dated Aug. 18, 2017 in KR Application No. 1020170041604.
Office Action dated Aug. 18, 2017 in KR Application No. 1020170041611.
Office Action dated Aug. 23, 2016 in JP Application No. 2016127005.
Office Action dated Aug. 29, 2019 in KR Application No. 1020197013298 (Partial English Translation).
Office Action dated Aug. 30, 2017 in CN Application No. 201611225799.X.
Office Action dated Sep. 20, 2018 in U.S. Appl. No. 15/627,629, by Ogata.
Office Action dated Sep. 28, 2016 in KR Application No. 1020160087266.
Office Action dated Oct. 2, 2018 in JP Application No. 2017243278 (Partial English Translation).
Office Action dated Oct. 2, 2018 in JP Application No. 2017243282 (Partial Translation).
Office Action dated Oct. 2, 2018 in JP Application No. 2017243286 (Partial English Translation).
Office Action dated Oct. 2, 2018 in JP Application No. 2017243289.
Office Action dated Oct. 2, 2018 in JP Application No. 2017243290 (Partial English Translation).
Office Action dated Oct. 22, 2018 in U.S. Appl. No. 15/627,556, by Ogata.
Office Action dated Oct. 22, 2018 in U.S. Appl. No. 15/627,664, by Ogata.
Office Action dated Oct. 22, 2018 in U.S. Appl. No. 15/627,671, by Ogata.
Office Action dated Oct. 24, 2018 in U.S. Appl. No. 15/627,804, by Ogata.
Office Action dated Nov. 29, 2016 in JP Application No. 2016024163 (Partial English Translation).
Office Action dated Dec. 6, 2016 in JP Application No. 2016127005.
Office Action dated Dec. 20, 2018 in U.S. Appl. No. 15/627,585, by Ogata.
Office Action dated Dec. 21, 2016 in KR Application No. 1020160077240.
Office Action dated Dec. 30, 2019 in U.S. Appl. No. 16/223,737, by Arise.
Office Action dated Dec. 31, 2018 in U.S. Appl. No. 15/627,736, by Ogata.
Solvay, "Solef PVDF, Design & Processing Guide," pp. 1-64 (2015).
Written Opinion dated Jan. 10, 2017 in International Application No. PCT/JP2016/081481.

\* cited by examiner

NONAQUEOUS ELECTROLYTE SECONDARY BATTERY

This Nonprovisional application claims priority under 35 U.S.C. § 119 on Patent Application No. 2017-243285 filed in Japan on Dec. 19, 2017, the entire contents of which are hereby incorporated by reference.

TECHNICAL FIELD

The present invention relates to a nonaqueous electrolyte secondary battery.

BACKGROUND ART

Nonaqueous electrolyte secondary batteries, particularly lithium secondary batteries, have a high energy density and are therefore in wide use as batteries for personal computers, mobile phones, mobile information terminals, and the like. Such nonaqueous electrolyte secondary batteries have recently been developed as on-vehicle batteries.

Patent Literature 1, for example, discloses a nonaqueous electrolyte secondary battery including a separator which is configured so that a temperature rise ending period in a case where the separator is irradiated with a microwave falls within a specific range.

CITATION LIST

Patent Literature

[Patent Literature 1]
Japanese Patent No. 6012838 (Registration date: Sep. 30, 2016)

SUMMARY OF INVENTION

Technical Problem

However, the nonaqueous electrolyte secondary battery described above has room for improvement in terms of a characteristic of an after-aging battery resistance (10 Hz resistance).

It is an object of an aspect of the present invention to achieve a nonaqueous electrolyte secondary battery having an excellent characteristic of an after-aging battery resistance (10 Hz resistance).

Solution to Problem

A nonaqueous electrolyte secondary battery in accordance with Aspect 1 of the present invention includes: a nonaqueous electrolyte secondary battery separator containing a polyolefin porous film; a porous layer containing a polyvinylidene fluoride-based resin; a positive electrode plate having a capacitance of 1 nF to 1000 nF per measurement area of 900 $mm^2$; and a negative electrode plate having a capacitance of 4 nF to 8500 nF per measurement area of 900 $mm^2$, the polyolefin porous film having a temperature rise ending period of 2.9 sec·$m^2$/g to 5.7 sec·$m^2$/g with respect to an amount of a resin per unit area in a case where the polyolefin porous film is (i) impregnated with N-methylpyrrolidone containing water in an amount of 3% by weight and then (ii) irradiated, at an output of 1,800 W, with a microwave having a frequency of 2,455 MHz, the porous layer being provided between the nonaqueous electrolyte secondary battery separator and at least one of the positive electrode plate and the negative electrode plate, and the polyvinylidene fluoride-based resin containing an α-form polyvinylidene fluoride-based resin in an amount of not less than 35.0 mol % with respect to 100 mol % of a total amount of (i) the α-form polyvinylidene fluoride-based resin and (ii) a β-form polyvinylidene fluoride-based resin contained in the polyvinylidene fluoride-based resin, where the amount of the α-form polyvinylidene fluoride-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

A nonaqueous electrolyte secondary battery in accordance with Aspect 2 of the present invention is, in Aspect 1, configured so that the positive electrode plate contains a transition metal oxide.

A nonaqueous electrolyte secondary battery in accordance with Aspect 3 of the present invention is, in Aspect 1 or 2, configured so that the negative electrode plate contains graphite.

The nonaqueous electrolyte secondary battery in accordance with Aspect 4 of the present invention is, in any one of Aspects 1 through 3, configured so as to further include: another porous layer which is provided between (i) the nonaqueous electrolyte secondary battery separator and (ii) at least one of the positive electrode plate and the negative electrode plate.

A nonaqueous electrolyte secondary battery in accordance with Aspect 5 of the present invention is, in any one of Aspects 1 through 4, configured so that the another porous layer contains at least one resin selected from the group consisting of a polyolefin, a (meth)acrylate-based resin, a fluorine-containing resin (excluding a polyvinylidene fluoride-based resin), a polyamide-based resin, a polyester-based resin, and a water-soluble polymer.

A nonaqueous electrolyte secondary battery in accordance with Aspect 6 of the present invention is, in Aspect 5, configured so that the polyamide-based resin is an aramid resin.

Advantageous Effects of Invention

With an aspect of the present invention, it is possible to achieve a nonaqueous electrolyte secondary battery having an excellent characteristic of an after-aging battery resistance (10 Hz resistance).

DESCRIPTION OF EMBODIMENTS

Figure 1:
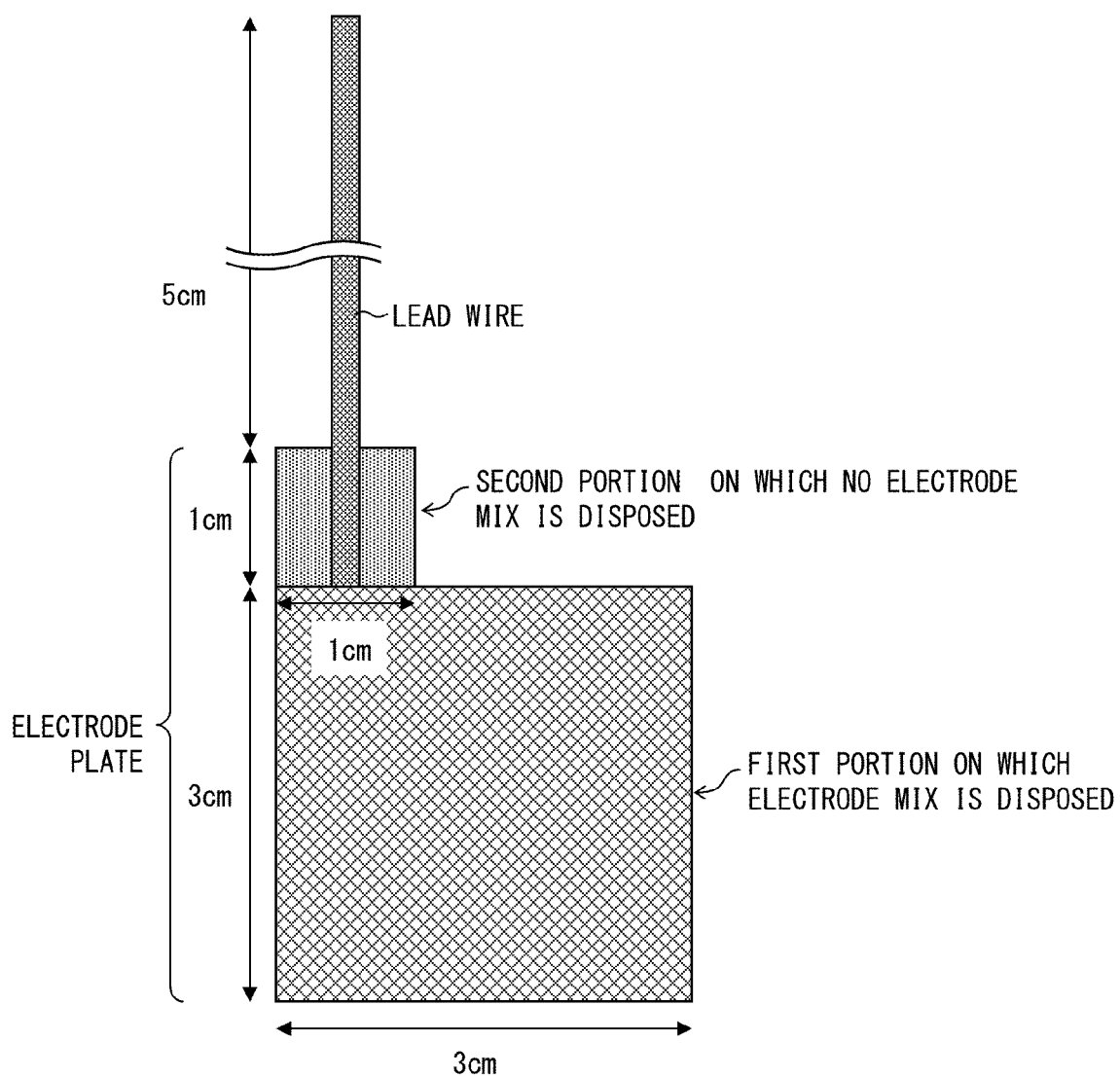
FIG. 1 is a view schematically illustrating a measurement target electrode whose capacitance was to be measured in Examples of the present application.

The following description will discuss an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. Any numerical range expressed as "A to B" herein means "not less than A and not more than B" unless otherwise stated.

A nonaqueous electrolyte secondary battery in accordance with an embodiment of the present invention includes: a nonaqueous electrolyte secondary battery separator (hereinafter also referred to as "separator") containing a polyolefin porous film (hereinafter also referred to as "porous film"); a porous layer containing a polyvinylidene fluoride-based resin (hereinafter also referred to as "PVDF-based resin"); a positive electrode plate having a capacitance of 1 nF to 1000 nF per measurement area of 900 mm$^2$; and a negative electrode plate having a capacitance of 4 nF to 8500 nF per measurement area of 900 mm$^2$, the polyolefin porous film having a temperature rise ending period of 2.9 sec·m$^2$/g to 5.7 sec·m$^2$/g with respect to an amount of a resin per unit area in a case where the polyolefin porous film is (i) impregnated with N-methylpyrrolidone containing water in an amount of 3% by weight and then (ii) irradiated, at an output of 1,800 W, with a microwave having a frequency of 2,455 MHz, the porous layer being provided between the nonaqueous electrolyte secondary battery separator and the positive electrode plate and/or the negative electrode plate (at least one of the positive electrode plate and the negative electrode plate), and the polyvinylidene fluoride-based resin containing an α-form polyvinylidene fluoride-based resin in an amount of not less than 35.0 mol % with respect to 100 mol % of a total amount of (i) the α-form polyvinylidene fluoride-based resin and (ii) a β-form polyvinylidene fluoride-based resin contained in the polyvinylidene fluoride-based resin, where the amount of the α-form polyvinylidene fluoride-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

The term "measurement area" herein means an area of a portion of a measurement electrode (upper (main) electrode, probe electrode) of an LCR meter which portion is in contact with a measurement target (a positive electrode plate, or a negative electrode plate) in a case where a capacitance is measured by a method of measuring a capacitance (described later). Therefore, a value of a capacitance per measurement area of X mm$^2$ means a value obtained in a case where a capacitance is measured with use of an LCR meter while a measurement target and a measurement electrode are in contact with each other such that an area of a portion of the measurement electrode which portion is in contact with the measurement target is X mm$^2$.

<Capacitance>

In the present invention, a value of a capacitance of a positive electrode plate is a value measured by a method of measuring a capacitance of an electrode plate (described later), that is, a value measured while an electrode for measurement (probe electrode, hereinafter referred to as "measurement electrode") is in contact with a surface of the positive electrode plate which surface is located on a positive electrode active material layer side. The capacitance of the positive electrode plate mainly indicates a polarization state of the positive electrode active material layer of the positive electrode plate.

Furthermore, in the present invention, a value of a capacitance of a negative electrode plate is a value measured by the method of measuring a capacitance of an electrode plate (described later), that is, a value measured while a measurement electrode is in contact with a surface of the negative electrode plate which surface is located on a negative electrode active material layer side. The capacitance of the negative electrode plate mainly indicates a polarization state of the negative electrode active material layer of the negative electrode plate.

In a case where a nonaqueous electrolyte secondary battery is discharged, ions serving as charge carriers are released from a negative electrode plate. The ions pass through a nonaqueous electrolyte secondary battery separator, and are then taken into a positive electrode plate. In this case, the ions are (i) solvated, by an electrolyte solvent, in the negative electrode plate or on a surface of the negative electrode plate and (ii) desolvated in a positive electrode plate or on a surface of the positive electrode plate. Note that the ions are Li$^+$ in a case where the nonaqueous electrolyte secondary battery is, for example, a lithium ion secondary battery.

Therefore, a degree to which the ions are solvated is affected by the polarization state of the negative electrode active material layer of the negative electrode plate. A degree to which the ions are desolvated is affected by the polarization state of the positive electrode active material layer of the positive electrode plate.

Therefore, the solvation can be promoted, to a proper extent, by controlling the capacitances of the negative electrode plate and the positive electrode plate to each fall within a suitable range, that is, by controlling the negative electrode active material layer and the positive electrode active material layer each to be in a suitable polarization state. This allows for improvement in permeation of ions as charge carriers, and allows for improvement in discharge output characteristic of a nonaqueous electrolyte secondary battery. In view of the above, the negative electrode plate of a nonaqueous electrolyte secondary battery in accordance with an embodiment of the present invention has a capacitance of 4 nF to 8500 nF, preferably 4 nF to 3000 nF, and more preferably 4 nF to 2600 nF, per measurement area of 900 mm$^2$. Note that a lower limit value of the capacitance can be not less than 100 nF, not less than 200 nF, or not less than 1000 nF, per measurement area of 900 mm$^2$.

Specifically, in a case where the negative electrode plate has a capacitance of less than 4 nF per measurement area of 900 mm$^2$, polarizability of the negative electrode plate is so low that the capacitance hardly contributes to promotion of the solvation above. Therefore, according to a nonaqueous electrolyte secondary battery including such a negative electrode plate, there is no improvement in output characteristic. Meanwhile, in a case where the negative electrode plate has a capacitance of more than 8500 nF per measurement area of 900 mm$^2$, the polarizability of the negative electrode plate is excessively high. This causes an excessive increase in compatibility between (i) inner walls of voids in the negative electrode plate and (ii) ions. This prevents the ions from moving (being released) from the negative electrode plate. Therefore, according to a nonaqueous electrolyte secondary battery including such a negative electrode plate, the output characteristic rather deteriorates.

In view of the above, the positive electrode plate of the nonaqueous electrolyte secondary battery in accordance with an embodiment of the present invention has a capacitance of 1 nF to 1000 nF, preferably 2 nF to 600 nF, and more preferably 2 nF to 400 nF, per measurement area of 900 mm$^2$. Note that the lower limit value of the capacitance can be not less than 3 nF.

Specifically, in a case where the positive electrode plate has a capacitance of less than 1 nF per measurement area of 900 mm$^2$, polarizability of the positive electrode plate is so low that the capacitance hardly contributes to promotion of the desolvation above. Therefore, according to a nonaqueous electrolyte secondary battery including such a positive electrode plate, there is no improvement in output characteristic. Meanwhile, in a case where the positive electrode plate has a capacitance of more than 1000 nF per measurement area of 900 mm$^2$, the polarizability of the positive electrode plate is excessively high. This causes excessive promotion of desolvation. Therefore, the solvent for the ions to move inside the positive electrode plate is desolvated, and there is excessively high compatibility between (i) inner walls of voids in the positive electrode plate and (ii) the ions which have been desolvated. This prevents movement of the ions inside the positive electrode plate. Therefore, according to a nonaqueous electrolyte secondary battery including such a positive electrode plate, the output characteristic rather deteriorates.

<Method of Adjusting Capacitance>

It is possible to control the capacitance of the positive electrode plate by adjusting a surface area of the positive electrode active material layer. It is also possible to control the capacitance of the negative electrode plate by adjusting a surface area of the negative electrode active material layer. Specifically, by, for example, smoothing surfaces of the positive electrode active material layer and the negative electrode active material layer with use of sandpaper or the like, it is possible to increase the surface areas of the positive electrode active material layer and the negative electrode active material layer. This makes it possible to increase the capacitance. Alternatively, it is possible to control the capacitance of the positive electrode plate by adjusting a relative permittivity of a material of which the positive electrode plate is made, and it is possible to control the capacitance of the negative electrode plate by adjusting a relative permittivity of a material of which the negative electrode plate is made. The relative permittivity can be adjusted by changing shapes of the voids, a porosity, and distribution of the voids of each of the positive electrode plate and the negative electrode plate. The relative permittivity can be alternatively controlled by adjusting the material of which each of the positive electrode plate and the negative electrode plate is made.

<Method of Measuring Capacitance of Electrode Plate>

According to an embodiment of the present invention, the capacitance of each of the positive electrode plate and the negative electrode plate (hereinafter each also referred to as an electrode plate) per measurement area of 900 mm$^2$ is measured with use of an LCR meter. Measurement is carried out at a frequency of 300 KHz while measurement conditions are set as follows: CV: 0.010 V, SPEED: SLOW2, AVG: 8, CABLE: 1 m, OPEN: All, SHORT: All DCBIAS 0.00 V.

In measurement of the capacitance, the capacitance is that of the electrode plate which has not been included in a nonaqueous electrolyte secondary battery. Meanwhile, a value of a capacitance is a unique value determined depending on, for example, (i) a shape (surface area) of a solid insulating material (electrode plate), (ii) a material of which the solid insulating material is made, (iii) shapes of voids in the solid insulating material, (iv) a porosity of the solid insulating material, and (v) distribution of the voids. Therefore, the value of the capacitance of the electrode plate which has been included in the nonaqueous electrolyte secondary battery, is equivalent to that of the capacitance of the electrode plate which has not been included in the nonaqueous electrolyte secondary battery.

Note that the capacitance of each of the positive electrode plate and the negative electrode plate can be measured after (i) the positive electrode plate and the negative electrode plate are included in the nonaqueous electrolyte secondary battery, (ii) the nonaqueous electrolyte secondary battery are charged and discharged, and then (iii) the positive electrode plate and the negative electrode plate are taken out from the nonaqueous electrolyte secondary battery. Specifically, for example, an electrode laminated body (a member for a nonaqueous electrolyte secondary battery (hereinafter referred to as a "nonaqueous electrolyte secondary battery member")) is taken out from an external member of the nonaqueous electrolyte secondary battery, and is dismantled to take out one electrode plate (the positive electrode plate or the negative electrode plate). From the one electrode plate thus taken out, a piece is cut off, which has a size similar to that of the electrode plate serving as a measurement target in the above-described method of measuring a capacitance of an electrode plate. This produces a test piece. Subsequently, the test piece is cleaned several times (for example, three times) in diethyl carbonate (hereinafter also referred to as "DEC"). The cleaning is a step in which an electrolyte, a product of decomposition of the electrolyte, a lithium salt, and the like, each stuck to a surface of the electrode plate, are removed by (i) putting and cleaning the test piece in the DEC and then (ii) repeating, several times (for example, three times), a procedure of replacing the DEC with new DEC and cleaning the test piece in the new DEC. The electrode plate which has been cleaned is sufficiently dried, and is then used as a measurement target. There is no limitation on (i) a type of the external member of the nonaqueous electrolyte secondary battery from which the external member the electrode laminated body is taken out or (ii) a structure of the electrode laminated body from which the electrode plate is taken out.

<Nonaqueous Electrolyte Secondary Battery Separator>

The nonaqueous electrolyte secondary battery separator in accordance with an embodiment of the present invention includes a polyolefin porous film.

The porous film by itself can serve as a nonaqueous electrolyte secondary battery separator. The porous film can also serve as a base material of a nonaqueous electrolyte secondary battery laminated separator in which a porous layer (described later) is disposed. The porous film contains a polyolefin-based resin as a main component, and has therein many pores connected to one another, so that a gas, a liquid, or the like can pass through the porous film from one surface to the other.

On at least one surface of the nonaqueous electrolyte secondary battery separator in accordance with an embodiment of the present invention, a porous layer containing a polyvinylidene fluoride-based resin (described later) can be disposed. In such a case, a laminated body obtained by disposing the porous layer on the at least one surface of the nonaqueous electrolyte secondary battery separator is herein also referred to as "nonaqueous electrolyte secondary battery laminated separator" or "laminated separator". The nonaqueous electrolyte secondary battery separator in accordance with an embodiment of the present invention can further contain another layer in addition to the polyolefin porous film. Examples of the another layer encompass an adhesive layer, a heat-resistant layer, and a protective layer.

(Polyolefin Porous Film)

A polyolefin contained in the porous film accounts for not less than 50% by volume, preferably not less than 90% by volume, and more preferably not less than 95% by volume, of the entire porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because such a high molecular weight component content causes an increase in strength of the nonaqueous electrolyte secondary battery separator.

Specific examples of the polyolefin, which is a thermoplastic resin, encompass a homopolymer and a copolymer, each of which is produced through (co)polymerization of a monomer(s) such as ethylene, propylene, 1-butene, 4-methyl-1-pentene, and/or 1-hexene. Examples of the homopolymer encompass polyethylene, polypropylene, and polybutene. Examples of the copolymer encompass an ethylene-propylene copolymer.

Among these, polyethylene is more preferable because it is possible (shut down) a flow of an excessively large electric current at a lower temperature. Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these, ultra-high molecular weight polyethylene having a weight-average molecular weight of not less than 1,000,000 is still more preferable.

The porous film has a thickness of preferably 4 μm to 40 μm, more preferably 5 μm to 30 μm, and still more preferably 6 μm to 15 μm.

The porous film only needs to have a weight per unit area which weight is determined as appropriate in view of the strength, thickness, weight, and handleability of the separator. Note, however, that the porous film has a weight per unit area of preferably 4 g/m² to 20 g/m², more preferably 4 g/m² to 12 g/m², and still more preferably 5 g/m² to 10 g/m², so as to allow a nonaqueous electrolyte secondary battery, which includes a nonaqueous electrolyte secondary battery laminated separator including the porous film, to have a higher weight energy density and a higher volume energy density.

The porous film has an air permeability of preferably 30 sec/100 mL to 500 sec/100 mL and more preferably 50 sec/100 mL to 300 sec/100 mL, in terms of Gurley values. A porous film having such an air permeability allows for sufficient ion permeability.

The porous film has a porosity of preferably 20% by volume to 80% by volume and more preferably 30% by volume to 75% by volume, so as to (i) retain a larger amount of an electrolyte and (ii) obtain the function of reliably preventing (shutting down) a flow of an excessively large electric current at a lower temperature. The porous film has a pore diameter of preferably not more than 0.3 μm and more preferably not more than 0.14 μm, so as to (i) obtain sufficient ion permeability and (ii) prevent particles from entering the positive electrode or the negative electrode.

The porous film in accordance with an embodiment of the present invention can be produced by, for example, the following method.

Specifically, the porous film can be obtained by a method including the steps of (1) obtaining a polyolefin resin composition by kneading (i) an ultra-high molecular weight polyethylene, (ii) a low molecular weight polyolefin having a weight-average molecular weight of not more than 10,000, and (iii) a pore forming agent such as calcium carbonate or a plasticizer, (2) forming (rolling) a sheet with use of a reduction roller to roll the polyolefin resin composition, (3) removing the pore forming agent from the sheet obtained in the step (2), and (4) obtaining a porous film by stretching the sheet obtained in the step (3).

The structure of pores of a porous film (namely, the capillary force of the pores, the area of the wall of the pores, and stress remaining in the porous film) is affected by (i) a strain rate during the stretching in the step (4) and (ii) a temperature during a heat-fixation treatment (annealing treatment) after the stretching per unit thickness of the stretched film (that is, a heat fixation temperature per unit thickness of the stretched film). Therefore, in a case where the strain rate and the heat fixation temperature per unit thickness of the stretched film have been adjusted, controlling the structure of the pores of the porous film makes it possible to control the temperature rise ending period with respect to the amount of resin per unit area.

Specifically, a porous film in accordance with an embodiment of the present invention tends to be produced by adjusting the straining rate and the heat-fixation temperature per unit thickness of the stretched film on a graph having an x-axis indicative of the strain rate and a y-axis indicative of the heat-fixation temperature per unit thickness of the stretched film so that the strain rate and the heat fixation temperature per unit thickness of the stretched film fall within a triangular area having three vertices at (500% per minute, 1.5° C./μm), (900% per minute, 14.0° C./μm), and (2500% per minute, 11.0° C./μm). Preferably, the strain rate and the heat fixation temperature per unit thickness of the stretched film are adjusted so as to fall within a triangular area having three vertices at (600% per minute, 5.0° C./μm), (900% per minute, 12.5° C./μm), and (2500% per minute, 11.0° C./μm).

A porous film, which contains N-methylpyrrolidone containing water and which is irradiated with a microwave, generates heat by vibrational energy of the water. The heat thus generated is transferred to a resin of the porous film, with which resin the N-methylpyrrolidone containing the water is in contact. A temperature rise ends when equilibrium is reached between (i) a rate of heat generation and (ii) a rate of cooling caused by heat transfer to the resin. Because of this, a time until the temperature rise ends (temperature rise ending period) is associated with a degree of contact between (i) liquid contained in the porous film (the N-methylpyrrolidone containing water in this case) and (ii) the resin of which the porous film is made. Note that this degree of contact is closely associated with (i) a capillary force in the pores of the porous film and (ii) an area of the wall of the pores. This makes it possible to use the temperature rise ending period to evaluate the structure of the pores of the porous film (a capillary force in pores and the area of the wall of the pores). Specifically, a shorter temperature rise ending period indicates a greater capillary force in the pores and a greater area of the wall of the pores.

The degree of contact between the liquid contained in the porous film and the resin contained in the porous film is presumably larger in a case where liquid moves more easily through the pores of the porous film. This makes it possible to use the temperature rise ending period to evaluate the capability of the porous film to supply the electrolyte solution to the electrode. Specifically, a shorter temperature rise ending period indicates a greater capability of the porous film to supply the electrolyte solution to the electrode.

The porous film has a temperature rise ending period of 2.9 sec·m²/g to 5.7 sec·m²/g and preferably 2.9 sec·m²/g to 5.3 sec·m²/g with respect to an amount of a resin per unit area in a case where the porous film is (i) impregnated with N-methylpyrrolidone containing water in an amount of 3% by weight and then (ii) is irradiated, at an output of 1,800 W, with a microwave having a frequency of 2,455 MHz. Note that the temperature of the porous film impregnated with N-methylpyrrolidone containing water in an amount of 3% by weight when the irradiation with a microwave starts falls within a range of 29° C.±1° C. Note also that the temperature rise ending period is to be measured in an atmosphere in an apparatus where a temperature is normal temperature (e.g., 30° C.±3° C.).

If the temperature rise ending period with respect to the amount of resin per unit area is less than 2.9 sec·m$^2$/g, then the capillary force in the pores of the porous film and the area of the wall of the pores both become excessively large. This leads to an increase in the stress applied to the wall of the pores when the electrolyte moves through the pores during a charge-discharge cycle and/or during use of the battery with a large electric current. This causes the pores to be blocked, and consequently causes a battery output characteristic to deteriorate.

Meanwhile, if the temperature rise ending period with respect to the amount of resin per unit area is more than 5.7 sec·m$^2$/g, then (i) liquid moves less easily through the pores of the porous film and (ii) the electrolyte moves more slowly near the interface between the porous film and an electrode in a case where the porous film is used as a separator for a nonaqueous electrolyte secondary battery. This causes a rate characteristic of the battery to deteriorate. In addition, in a case where the battery has been charged and discharged repeatedly, the electrolyte is more is easily locally depleted at the interface between the separator and an electrode or inside the porous film. This leads to an increase in the internal resistance of the battery, and therefore causes the nonaqueous electrolyte secondary battery to have a deteriorated rate characteristic after the charge-discharge cycle.

In contrast, a temperature rise ending period of 2.9 sec·m$^2$/g to 5.7 sec·m$^2$/g with respect to the amount of resin per unit area allows for an excellent initial rate characteristic and prevents the rate characteristic from deteriorating through a charge-discharge cycle. In addition, as demonstrated in the Examples described later, it is possible to improve the characteristic of after-aging battery resistance (10 Hz resistance).

In a case where the porous layer or the another layer is disposed on the porous film, physical property values of the porous film, which is included in the laminated body including the porous film and the porous layer or the another layer, can be measured after the porous layer or the another layer is removed from the laminated body. The porous layer or the another layer can be removed from the laminated body by, for example, a method of dissolving the resin of the porous layer or of the another layer with use of a solvent such as N-methylpyrrolidone or acetone for removal.

(Porous Layer)

The porous layer, as a member included in a nonaqueous electrolyte secondary battery, is provided between (i) a nonaqueous electrolyte secondary battery separator and (ii) at least one of the positive electrode plate and the negative electrode plate. The porous layer can be provided on one surface or both surfaces of the nonaqueous electrolyte secondary battery separator. Alternatively, the porous layer can be disposed on an active material layer of at least one of the positive electrode plate and the negative electrode plate. Alternatively, the porous layer can be provided between the nonaqueous electrolyte secondary battery separator and at least one of the positive electrode plate and the negative electrode plate so as to be in contact with the nonaqueous electrolyte secondary battery separator and with the at least one of the positive electrode plate and the negative electrode plate. The porous layer, which is provided between the nonaqueous electrolyte secondary battery separator and at least one of the positive electrode plate and the negative electrode plate, can be a single layer or can be made up of two or more layers.

The porous layer is preferably an insulating porous layer containing a resin.

The resin, which can be contained in the porous layer, is preferably a resin that is insoluble in the electrolyte of the battery and that is electrochemically stable when the battery is in normal use. In a case where the porous layer is disposed on one surface of the porous film, the porous layer is disposed preferably on a surface of the porous film which surface faces the positive electrode plate of the nonaqueous electrolyte secondary battery, and more preferably on a surface of the porous film which surface is in contact with the positive electrode plate.

The porous layer in accordance with an embodiment of the present invention contains a PVDF-based resin, the PVDF-based resin containing a PVDF-based resin having crystal form α (hereinafter referred to as "α-form PVDF-based resin") in an amount of not less than 35.0 mol % with respect to 100 mol % of the total amount of (i) the α-form PVDF-based resin and (ii) a PVDF-based resin having crystal form β (hereinafter referred to as "β-form PVDF-based resin") contained in the PVDF-based resin.

The amount of the α-form PVDF-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

The porous layer has a structure in which many pores, connected to one another, are provided, so that the porous layer is a layer through which a gas or a liquid can pass from one surface to the other. Further, in a case where the porous layer in accordance with an embodiment of the present invention is used as a member included in a nonaqueous electrolyte secondary battery laminated separator, the porous layer can be a layer which, serving as an outermost layer of the separator, adheres to an electrode.

Examples of the PVDF-based resin encompass: homopolymers of vinylidene fluoride; copolymers of vinylidene fluoride and other monomer(s) copolymerizable with vinylidene fluoride; and mixtures of the above polymers. Examples of the monomer copolymerizable with vinylidene fluoride encompass hexafluoropropylene, tetrafluoroethylene, trifluoroethylene, trichloroethylene, and vinyl fluoride. One kind of these monomers can be used or two or more of kinds of these monomers can be used in combination. The PVDF-based resin can be synthesized through emulsion polymerization or suspension polymerization.

The PVDF-based resin contains vinylidene fluoride at a proportion of ordinarily not less than 85 mol %, preferably not less than 90 mol %, more preferably not less than 95 mol %, still more preferably not less than 98 mol %. A PVDF-based resin containing vinylidene fluoride at a proportion of not less than 85 mol % easily allows a porous layer to have (i) a mechanical strength against pressure applied during battery production and (ii) a resistance to heat applied during battery production.

In a preferable aspect, the porous layer preferably contains two kinds of PVDF-based resins (a first resin and a second resin described below) that are different in terms of, for example, hexafluoropropylene content.

First resin: (i) a vinylidene fluoride-hexafluoropropylene copolymer containing hexafluoropropylene in an amount of more than 0 mol % and not more than 1.5 mol % or (ii) a vinylidene fluoride homopolymer.

Second resin: a vinylidene fluoride-hexafluoropropylene copolymer containing hexafluoropropylene in an amount of more than 1.5 mol %.

A porous layer containing the two kinds of PVDF-based resins has improved adhesiveness to an electrode in comparison with a porous layer lacking either one of the two kinds of PVDF-based resins. Furthermore, in comparison with a porous layer lacking either one of the two kinds of PVDF-based resin, a porous layer containing the two kinds of PVDF-based resins has improved adhesiveness to another layer (for example, the porous film layer) included in a nonaqueous electrolyte secondary battery separator. This leads to an increase in peel force between the two layers. The first resin and the second resin are preferably mixed at a mass ratio of 15:85 to 85:15.

The PVDF-based resin has a weight-average molecular weight of preferably 200,000 to 3,000,000, more preferably 200,000 to 2,000,000, and still more preferably 500,000 to 1,500,000. A PVDF-based resin having a weight-average molecular weight of not less than 200,000 tends to allow the porous layer to sufficiently adhere to an electrode. Meanwhile, a PVDF-based resin having a weight-average molecular weight of not more than 3,000,000 tends to allow the porous layer to have excellent formability.

The porous layer in accordance with an embodiment of the present invention can contain a resin other than the PVDF-based resin. Examples of the resin encompass: a styrene-butadiene copolymer; homopolymers or copolymers of vinyl nitriles such as acrylonitrile and methacrylonitrile; and polyethers such as polyethylene oxide and polypropylene oxide.

The porous layer in accordance with an embodiment of the present invention can contain a filler which can be an inorganic filler or an organic filler. The filler is contained at a proportion of preferably 1% by mass to 99% by mass and more preferably 10% by mass to 98% by mass, with respect to the total amount of the PVDF-based resin and the filler. A lower limit value of the proportion of the filler can be not less than 50% by mass, not less than 70% by mass, or not less than 90% by mass. The filler, such as an organic filler or an inorganic filler, can be a conventionally known filler.

The porous layer in accordance with an embodiment of the present invention has an average thickness of preferably 0.5 μm to 10 μm (per layer), and more preferably 1 μm to 5 μm (per layer), in order to secure (i) adhesiveness of the porous layer to an electrode and (ii) a high energy density.

A porous layer having a thickness of not less than 0.5 μm (per layer) is preferable because, in such a case, it is possible to (i) prevent an internal short circuit from occurring due to, for example, breakage of a nonaqueous electrolyte secondary battery and (ii) allow an amount of electrolyte retained in the porous layer to be sufficient.

Meanwhile, if the thickness of the porous layer (per layer) is more than 10 μm, then a nonaqueous electrolyte secondary battery will have an increased resistance to permeation of lithium ions. Therefore, repeating charge and discharge cycles causes the positive electrode of the nonaqueous electrolyte secondary battery to deteriorate. This causes a rate characteristic and a cycle characteristic to deteriorate. Further, such a porous layer leads to an increased distance between the positive electrode and the negative electrode. This causes a nonaqueous electrolyte secondary battery to become larger in size.

The porous layer in accordance with the present embodiment is preferably provided between (i) the nonaqueous electrolyte secondary battery separator and (ii) a positive electrode active material layer included in the positive electrode plate. Physical properties of the porous layer, which are described below, at least refer to physical properties of the porous layer which is provided between (i) a nonaqueous electrolyte secondary battery separator of a nonaqueous electrolyte secondary battery and (ii) a positive electrode active material layer included in a positive electrode plate of the nonaqueous electrolyte secondary battery.

The porous layer has a weight per unit area (per layer) which can be set as appropriate, in view of strength, a thickness, a weight, and handleability of the porous layer. A coating amount (weight per unit area) of the porous layer is preferably 0.5 $g/m^2$ to 20 $g/m^2$ (per layer) and more preferably 0.5 $g/m^2$ to 10 $g/m^2$ (per layer).

The porous layer, which has a weight per unit area which weight falls within the above numerical ranges, allows a nonaqueous electrolyte secondary battery including the porous layer to have a higher weight energy density and a higher volume energy density. If the weight per unit area of the porous layer is beyond the above ranges, then the nonaqueous electrolyte secondary battery will be heavy.

The porous layer has a porosity of preferably 20% by volume to 90% by volume and more preferably 30% by volume to 80% by volume, in order to achieve sufficient ion permeability. The pore diameter of the pores of the porous layer is preferably not more than 1.0 μm, more preferably not more than 0.5 μm. The porous layer having pores which are set to have a pore diameter falling within these ranges allows a nonaqueous electrolyte secondary battery, which includes a nonaqueous electrolyte secondary battery laminated separator including the porous layer, to achieve sufficient ion permeability.

The nonaqueous electrolyte secondary battery laminated separator has an air permeability of preferably 30 sec/100 mL to 1000 sec/100 mL and more preferably 50 sec/100 mL to 800 sec/100 mL, in terms of Gurley values. A nonaqueous electrolyte secondary battery laminated separator having an air permeability falling within the above ranges allows a nonaqueous electrolyte secondary battery, which includes the nonaqueous electrolyte secondary battery laminated separator, to have sufficient ion permeability.

A nonaqueous electrolyte secondary battery laminated separator, which has an air permeability lower than the above ranges means that the nonaqueous electrolyte secondary battery laminated separator has a coarse laminated structure due to a high porosity thereof. This causes the nonaqueous electrolyte secondary battery laminated separator to have a lower strength, so that the nonaqueous electrolyte secondary battery laminated separator may be insufficient in shape stability, particularly shape stability at a high temperature. Meanwhile, if the air permeability is beyond the above ranges, then a nonaqueous electrolyte secondary battery laminated separator may not have sufficient ion permeability. This may lead to deterioration of a battery characteristic of a nonaqueous electrolyte secondary battery.

(Crystal Forms of PVDF-Based Resin)

The PVDF-based resin contained in the porous layer used in an embodiment of the present invention contains an α-form PVDF-based resin in an amount of not less than 35.0 mol %, preferably not less than 37.0 mol %, more preferably not less than 40.0 mol %, and still more preferably not less than 44.0 mol %, with respect to 100 mol % of the total amount of (i) the α-form PVDF-based resin and (ii) a β-form PVDF-based resin contained. Further, the amount of α-form PVDF-based resin is preferably not more than 90.0 mol %. A porous layer containing the α-form PVDF-based resin in an amount falling within the above ranges is suitably used as a constituent member of a nonaqueous electrolyte secondary battery having an excellent characteristic of an after-aging battery resistance (10 Hz resistance), particularly as a constituent member of a laminated separator for such a nonaqueous electrolyte secondary battery or as a constituent member of an electrode for such a nonaqueous electrolyte secondary battery.

A nonaqueous electrolyte secondary battery generates heat during charge/discharge due to internal resistance. An α-form PVDF-based resin in a PVDF-based resin has a melting point higher than that of a β-form PVDF-based resin in the PVDF-based resin. This causes the α-form PVDF-based resin to be less likely to undergo plastic deformation due to heat than the β-form PVDF-based resin. It is known that a β-form PVDF-based resin is more polarizable than an α-form PVDF-based resin because a β-form PVDF-based resin has a structure in which F atoms are arranged in one side of the structure.

According to the porous layer in accordance with an embodiment of the present invention, controlling a proportion of the α-form PVDF-based resin of the PVDF-based resin contained in the porous layer to be equal to or more than a certain value makes the following possible: (i) to decrease, for example, deformation of an internal structure of the porous layer and blockage of voids, the deformation and the blockage occurring due to deformation of the PVDF-based resin as a result of heat generated during charge/discharge and (ii) to prevent uneven distribution of Li ions, which uneven distribution occurs due to interaction between the Li ions and the PVDF-based resin. This consequently prevents a battery from deteriorating in performance.

The α-form PVDF-based resin is arranged such that the polymer of the PVDF-based resin contains a PVDF skeleton having molecular chains including a main-chain carbon atom bonded to a fluorine atom (or a hydrogen atom) which is adjacent to two carbon atoms, one of which is bonded to a hydrogen atom (or a fluorine atom) having a trans position and the other (opposite) one of which is bonded to a hydrogen atom (or a fluorine atom) having a gauche position (positioned at an angle of 60°), such that two or more such conformations are chained consecutively as follows:

$$(TG\overline{TG}\ Structure) \qquad [\text{Math. 1}]$$

and the molecular chains each have the following type:

$$TG\overline{TG} \qquad [\text{Math. 2}]$$

such that the respective dipole moments of $C-F_2$ and $C-H_2$ bonds each have a component perpendicular to the molecular chain and a component parallel to the molecular chain.

In a $^{19}F$-NMR spectrum of the α-form PVDF-based resin, characteristic peaks appear at around −95 ppm and at around −78 ppm.

The β-form PVDF-based resin is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180° to the direction of the carbon-carbon bond.

The β-form PVDF-based resin can be arranged such that the polymer of the PVDF-based resin contains a PVDF skeleton that has a TT-type conformation in its entirety. The β-form PVDF-based resin can alternatively be arranged such that a portion of the PVDF skeleton has a TT-type conformation and that the β-form PVDF-based resin has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of $C-F_2$ and $C-H_2$ bonds each have a component perpendicular to the molecular chain.

In a $^{19}F$-NMR spectrum of the β-form PVDF-based resin, a characteristic peak appears at around −95 ppm.

(Method of Calculating α-Form PVDF-Based Resin Content Rate and β-Form PVDF-Based Resin Content Rate of PVDF-Based Resin)

An α-form PVDF-based resin content rate and a β-form PVDF-based resin content rate of a porous layer in accordance with an embodiment of the present invention, with respect to 100 mol % of the total amount of the α-form PVDF-based resin and the β-form PVDF-based resin contained, can be calculated from $^{19}F$-NMR spectrum obtained from the porous layer. Specifically, the following calculation method, for example, can be employed.

(1) An $^{19}F$-NMR spectrum is measured from a porous layer containing a PVDF-based resin, under the following conditions.

Measurement Conditions

Measurement device: AVANCE400 manufactured by Bruker Biospin
Measurement method: single-pulse method
Observed nucleus: $^{19}F$
Spectral bandwidth: 100 kHz
Pulse width: 3.0 s (90° pulse)
Pulse repetition time: 5.0 s
Reference material: $C_6F_6$ (external reference: −163.0 ppm)
Temperature: 22° C.
Sample rotation frequency: 25 kHz (2) An integral value of a peak at around −78 ppm in the $^{19}F$-NMR spectrum obtained in (1) is calculated and is regarded as an α/2 amount.

(3) As with the case of (2), an integral value of a peak at around −95 ppm in the $^{19}F$-NMR spectrum obtained in (1) is calculated and is regarded as an $\{(α/2)+β\}$ amount.

(4) The α-form PVDF-based resin content rate (hereinafter also referred to as "α rate") is calculated from the integral value obtained in (2) and (3) according to the following Formula (1), where the total amount of the α-form PVDF-based resin contained and the β-form PVDF-based resin contained is 100 mol %:

$$\alpha\ \text{rate (mol \%)}=[(\text{integral value at around }−78\ \text{ppm})\times 2/\{(\text{integral value at around }−95\ \text{ppm})+(\text{integral value at around }−78\ \text{ppm})\}]\times 100 \qquad (1)$$

(5) The β-form PVDF-based resin content rate (hereinafter also referred to as "β rate") is calculated from the α rate obtained in (4) according to the following Formula (2), where the total amount of the α-form PVDF-based resin and β-form PVDF-based resin contained is 100%:

$$\beta\ \text{rate (mol \%)}=100\ (\text{mol \%})-\alpha\ \text{rate (mol \%)} \qquad (2)$$

(Porous Layer Production Method, Nonaqueous Electrolyte Secondary Battery Laminated Separator Production Method)

The porous layer in accordance with an embodiment of the present invention and the nonaqueous electrolyte secondary battery laminated separator in accordance with an embodiment of the present invention can be produced by any of various methods.

For example, a porous layer containing a PVDF-based resin and optionally a filler is formed, through one of processes (1) through (3) described below, on a surface of a porous film which is to serve as a base material. In a case where the process (2) or (3) is carried out, the porous layer can be produced by further drying a deposited porous layer so as to remove a solvent. In a case where a coating solution in any of the processes (1) through (3) is used for production of a porous layer containing a filler, the coating solution is preferably configured so that (i) the filler is dispersed in the coating solution and (ii) a PVDF-based resin is dissolved in the coating solution.

The coating solution for use in a method of producing the porous layer in accordance with an embodiment of the present invention can be prepared ordinarily by (i) dissolving, in a solvent, a resin to be contained in the porous layer and (ii) dispersing, in the solvent, the filler to be contained in the porous layer.

(1) A process in which (i) a surface of a porous film is coated with a coating solution containing (a) a PVDF-based resin to form a porous layer and optionally (b) a filler and (ii) the surface of the porous film is dried to remove the solvent (dispersion medium) from the coating solution, so that the porous layer is formed.

(2) A process in which (i) a surface of a porous film is coated with the coating solution described in (1) and then (ii) the resultant porous film is immersed in a deposition solvent (which is a poor solvent for the PVDF-based resin), so that a porous layer is deposited.

(3) A process in which (i) a surface of a porous film is coated with a coating solution described in (1) and then (ii) the coating solution is made acidic with use of a low-boiling-point organic acid, so that a porous layer is deposited.

Examples of the solvent (dispersion medium) in the coating solution encompass N-methylpyrrolidone, N,N-dimethylacetamide, N,N-dimethylformamide, acetone, and water.

Preferable examples of the deposition solvent encompass isopropyl alcohol and t-butyl alcohol.

For the process (3), the low-boiling-point organic acid can be, for example, paratoluene sulfonic acid or acetic acid.

Examples of the base material other than the porous film encompass another film, a positive electrode plate, and a negative electrode plate.

As appropriate, the coating solution can contain, as a component different from the resin and the filler, additive(s) such as a dispersing agent, a plasticizer, a surfactant, and/or a pH adjuster.

The base material can be coated with coating solution by a conventionally publicly known method. Specific examples of such a method encompass a gravure coater method, a dip coater method, a bar coater method, and a die coater method.

(Method of Controlling Crystal Form of PVDF-Based Resin)

The crystal form of a PVDF-based resin contained in the porous layer in accordance with an embodiment of the present invention can be controlled with (i) drying conditions in the above-described method, such as (a) a drying temperature and (b) air velocity and air direction during drying and (ii) a deposition temperature in a case where a porous layer containing a PVDF-based resin is deposited with use of a deposition solvent or a low-boiling-point organic acid.

The drying conditions and the deposition temperature, which are adjusted so that the PVDF-based resin contains α-form PVDF-based resin in an amount of not less than 35.0 mol % with respect to 100 mol % of the total amount of (i) the α-form PVDF-based resin and (ii) a β-form PVDF-based resin contained in the PVDF-based resin, can be changed as appropriate by changing, for example, the method of producing a porous layer, the kind of solvent (dispersion medium) to be used, the kind of deposition solvent to be used, and/or the kind of low-boiling-point organic acid to be used.

In a case where the coating solution is simply dried as in the process (1), the drying conditions can be changed as appropriate by adjusting, for example, the amount of the solvent in the coating solution, the PVDF-based resin concentration in the coating solution, the amount of the filler (if contained), and/or the coating amount of the coating solution. In a case where a porous layer is to be formed through the process (1), it is preferable that (i) the drying temperature is 30° C. to 100° C., (ii) the direction of hot air for drying is perpendicular to a porous film or electrode sheet which has been coated with the coating solution, and (iii) the velocity of the hot air is 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that (i) the drying temperature is 40° C. to 100° C., (ii) the direction of hot air for drying is perpendicular to a porous film or electrode sheet which has been coated with the coating solution, and (iii) the velocity of the hot air is 0.4 m/s to 40 m/s.

In a case where a porous layer is to be formed through the process (2), the deposition temperature is preferably −25° C. to 60° C., and the drying temperature is preferably 20° C. to 100° C. Specifically, in a case where a porous layer is to be formed through the process (2) with use of N-methylpyrrolidone as the solvent for dissolving a PVDF-based resin and isopropyl alcohol as the deposition solvent, it is preferable that (i) the deposition temperature is −10° C. to 40° C. and (ii) the drying temperature is 30° C. to 80° C.

(Another Porous Layer)

The nonaqueous electrolyte secondary battery in accordance with an embodiment of the present invention can contain another porous layer in addition to (i) the porous film and (ii) the porous layer containing the PVDF-based resin. The another porous layer need only be provided between (i) the nonaqueous electrolyte secondary battery separator and (ii) at least one of the positive electrode plate and the negative electrode plate. The porous layer and the another porous layer may be provided in any order with respect to the nonaqueous electrolyte secondary battery separator. In a preferable configuration, the porous film, the another porous layer, and the porous layer containing the PVDF-based resin are disposed in this order. In other words, the another porous layer is provided between the porous film and the porous layer containing the PVDF-based resin. In another preferable configuration, the another porous layer and the porous layer containing the PVDF-based resin are provided in this order on both surfaces of the porous film.

Examples of a resin which can be contained in the another porous layer in accordance with an embodiment of the present invention encompass: polyolefins; (meth)acrylate-based resins; fluorine-containing resins (excluding polyvinylidene fluoride-based resins); polyamide-based resins; polyimide-based resins; polyester-based resins; rubbers; resins with a melting point or glass transition temperature of not lower than 180° C.; water-soluble polymers; polycarbonate, polyacetal, and polyether ether ketone.

Among the above resins, polyolefins, (meth)acrylate-based resins, polyamide-based resins, polyester-based resins, and water-soluble polymers are preferable.

Preferable examples of the polyolefin encompass polyethylene, polypropylene, polybutene, and an ethylene-propylene copolymer.

Examples of the fluorine-containing resins encompass polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins encompass fluorine-containing rubber having a glass transition temperature of not higher than 23° C.

Preferable examples of the polyamide-based resin encompass aramid resins such as aromatic polyamide and wholly aromatic polyamide.

Specific examples of the aramid resin encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these aramid resins, poly(paraphenylene terephthalamide) is more preferable.

Preferable examples of the polyester-based resin encompass (i) aromatic polyesters such as polyarylate and (ii) liquid crystal polyesters.

Examples of the rubbers encompass a styrene-butadiene copolymer and a hydride thereof, a methacrylic acid ester copolymer, an acrylonitrile-acrylic acid ester copolymer, a styrene-acrylic acid ester copolymer, an ethylene propylene rubber, and polyvinyl acetate.

Examples of the resin with a melting point or a glass transition temperature of not lower than 180° C. encompass polyphenylene ether, polysulfone, polyether sulfone, polyphenylene sulfide, polyetherimide, polyamide imide, and polyether amide.

Examples of the water-soluble polymer encompass polyvinyl alcohol, polyethylene glycol, cellulose ether, sodium alginate, polyacrylic acid, polyacrylamide, and polymethacrylic acid.

Only one kind of these resins to be contained in the another porous layer can be used, or two or more kinds of these resins can be used in combination.

The other characteristics (e.g., thickness) of the another porous layer are similar to those (of the porous layer) described above, except that the porous layer contains the PVDF-based resin.

<Positive Electrode Plate>

The positive electrode plate included in the nonaqueous electrolyte secondary battery in accordance with an embodiment of the present invention is not limited to any particular one, provided that the positive electrode plate has a capacitance falling within the above-described ranges per measurement area of 900 $mm^2$. For example, a sheet-shaped positive electrode plate used in the nonaqueous electrolyte secondary battery includes (i) a positive electrode mix as a positive electrode active material layer, which positive electrode mix contains a positive electrode active material, an electrically conductive agent, and a binding agent and (ii) a positive electrode current collector supporting the positive electrode mix thereon. Note that the positive electrode plate can be arranged such that the positive electrode current collector supports positive electrode mixes on respective both surfaces of the positive electrode current collector or can be alternatively arranged such that the positive electrode current collector supports the positive electrode mix on one surface of the positive electrode current collector.

The positive electrode active material is, for example, a material capable of being doped with and dedoped of lithium ions. Specific examples of the material encompass a lithium complex oxide containing (i) at least one transition metal such as V, Mn, Fe, Co, or Ni and/or (ii) at least one oxide of such a transition metal.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination.

Examples of the binding agent include: thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoride-hexafluoropropylene-tetrafluoroethylene copolymer, a thermoplastic polyimide, polyethylene, and polypropylene; an acrylic resin; and styrene butadiene rubber. Note that the binding agent serves also as a thickener.

Examples of the positive electrode current collector encompass electric conductors such as Al, Ni, and stainless steel. Among these, Al is preferable because Al is easily processed into a thin film and is inexpensive.

Examples of a method of producing the sheet-shaped positive electrode plate encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) a positive electrode current collector is coated with the paste, and then (iii) the paste is dried and then pressured so that the paste is firmly fixed to the positive electrode current collector.

<Negative Electrode Plate>

The negative electrode plate included in the nonaqueous electrolyte secondary battery in accordance with an embodiment of the present invention is not limited to any particular one, provided that the negative electrode plate has a capacitance falling within the above-described ranges per measurement area of 900 $mm^2$. For example, a sheet-shaped negative electrode plate used in the nonaqueous electrolyte secondary battery includes (i) a negative electrode mix as a negative electrode active material layer, which negative electrode mix contains a negative electrode active material and (ii) a negative electrode current collector supporting the negative electrode mix thereon. The sheet-shaped negative electrode plate preferably contains an electrically conductive agent as described above and a binding agent as described above. Note that the negative electrode plate can be arranged such that the negative electrode current collector supports negative electrode mixes on respective both surfaces of the negative electrode current collector or can be alternatively arranged such that the negative electrode current collector supports the negative electrode mix on one surface of the negative electrode current collector.

Examples of the negative electrode active material encompass (i) a material capable of being doped with and dedoped of lithium ions, (ii) a lithium metal, and (iii) a lithium alloy. Examples of the material encompass a carbonaceous material. Examples of the carbonaceous material encompass natural graphite, artificial graphite, cokes, carbon black, and pyrolytic carbons. The electrically conductive agent can be any of the conductive agents described as those which can be contained in the positive electrode active material layer. The binding agent can be any of the binding agents described as those which can be contained in the positive electrode active material layer.

The negative electrode current collector is, for example, Cu, Ni, or stainless steel. Among these, Cu is preferable because it is not easily alloyed with lithium in the case of a lithium-ion secondary battery in particular and is easily processed into a thin film.

Examples of a method of producing the sheet-shaped negative electrode plate encompass: a method in which a negative electrode active material is pressure-molded on a negative electrode current collector; and a method in which (i) a negative electrode active material is formed into a paste with the use of a suitable organic solvent, (ii) a negative electrode current collector is coated with the paste, and then (iii) the paste is dried and then pressured so that the paste is firmly fixed to the negative electrode current collector. The paste preferably contains an electrically conductive agent as described above and a binding agent as described above.

<Nonaqueous Electrolyte>

A nonaqueous electrolyte, which can be contained in the nonaqueous electrolyte secondary battery in accordance with an embodiment of the present invention, is not limited to any particular one, provided that the nonaqueous electrolyte is that which is generally used in a nonaqueous electrolyte secondary battery. Examples of the nonaqueous electrolyte encompass a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use (i) only one kind of the above lithium salts or (ii) two or more kinds of the above lithium salts in combination.

Examples of the organic solvent contained in the nonaqueous electrolyte encompass carbonates, ethers, esters, nitriles, amides, carbamates, sulfur-containing compounds, and fluorine-containing organic solvents obtained by introducing a fluorine group into any of these organic solvents. It is possible to use (i) only one kind of the above organic solvents or (ii) two or more kinds of the above organic solvents in combination.

<Method of Producing Nonaqueous Electrolyte Secondary Battery>

The nonaqueous electrolyte secondary battery in accordance with an embodiment of the present invention can be produced by, for example, (i) forming the nonaqueous electrolyte secondary battery member by disposing the positive electrode plate, the porous layer, the nonaqueous electrolyte secondary battery separator, and the negative electrode plate in this order, (ii) placing the nonaqueous electrolyte secondary battery member in a container which is to serve as a housing of the nonaqueous electrolyte secondary battery, (iii) filling the container with the nonaqueous electrolyte, and then (iv) hermetically sealing the container while reducing pressure inside the container.

As described above, the nonaqueous electrolyte secondary battery in accordance with an embodiment of the present invention includes (i) the nonaqueous electrolyte secondary battery separator containing a polyolefin porous film, (ii) the porous layer, (iii) the positive electrode plate, and (iv) the negative electrode plate. In particular, the nonaqueous electrolyte secondary battery in accordance with an embodiment of the present invention satisfies the following requirements (i) through (iv):

(i) The polyvinylidene fluoride-based resin contained in the porous layer contains an α-form polyvinylidene fluoride-based resin in an amount of not less than 35.0 mol % with respect to 100 mol % of the total amount of (i) the α-form polyvinylidene fluoride-based resin and (ii) a β-form polyvinylidene fluoride-based resin contained in the polyvinylidene fluoride-based resin.

(ii) The positive electrode plate has a capacitance of 1 nF to 1000 nF per measurement area of 900 $mm^2$.

(iii) The negative electrode plate has a capacitance of 4 nF to 8500 nF per measurement area of 900 $mm^2$.

(iv) The porous film has a temperature rise ending period of 2.9 sec·$m^2$/g to 5.7 sec·$m^2$/g with respect to an amount of a resin per unit area in a case where the porous film is (a) impregnated with N-methylpyrrolidone containing water in an amount of 3% by weight and then (b) irradiated, at an output of 1,800 W, with a microwave having a frequency of 2,455 MHz.

According to a nonaqueous electrolyte secondary battery in accordance with an embodiment of the present invention which satisfies the requirement (iv), the following properties can be controlled to fall within a specific range: (a) the capability to supply an electrolyte from the polyolefin porous film to the electrode, (b) the capillary force in the pores, and (c) the area of the wall of the pores. This prevents the electrolyte from being depleted and prevents the pores from being blocked. According to a nonaqueous electrolyte secondary battery in accordance with an embodiment of the present invention which satisfies the requirement (i), plastic deformation of the polyvinylidene fluoride-based resin at a high temperature is prevented. This prevents the structure of the porous layer from being deformed and prevents voids from being blocked. According to a nonaqueous electrolyte secondary battery in accordance with an embodiment of the present invention which satisfies the requirements (ii) and (iii), the positive electrode active material layer of the positive electrode plate and the negative electrode active material layer of the negative electrode plate are each in a suitable polarization state. This promotes (a) solvation of cations with an electrolyte solvent, in the negative electrode plate and a place where the negative electrode plate and the nonaqueous electrolyte secondary battery separator are in contact with each other and (b) desolvation of cations from the electrolyte solvent, in the positive electrode plate and a place where the positive electrode plate and the nonaqueous electrolyte secondary battery separator are in contact with each other. Furthermore, in a case where the requirement (iv) is satisfied, the permeability of the polyolefin porous film (separator) to cations is promoted.

Therefore, with a nonaqueous electrolyte secondary battery satisfying the requirements (i) through (iv), the following (a) and (b) are made possible: (a) to decrease a reduction in performance of the nonaqueous electrolyte secondary battery, which reduction is caused by void blockage in the porous layer occurring as a result of charge and discharge of the battery and by void blockage in the polyolefin porous film occurring as a result of charge and discharge of the battery and (b) to control movement of an electrolyte, solvation of $Li^+$, and desolvation of $Li^+$, all of which occur in the nonaqueous electrolyte secondary battery during charge/discharge, by specifically controlling physical properties of the positive electrode plate and the negative electrode plate. Consequently, according to a nonaqueous electrolyte secondary battery satisfying the requirements (i) through (iv) and having been subjected to aging, an internal resistance of the nonaqueous electrolyte secondary battery is decreased.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will discuss embodiments of the present invention in more detail by Examples and Comparative Examples. Note, however, that the present invention is not limited to these Examples and Comparative Examples.

[Measurement Method]

Measurement in Production examples and Comparative Examples described below were performed by the following methods.

(1) Thickness (Unit: μm)

With use of a high-resolution digimatic measuring unit (VL-50) manufactured by Mitutoyo Corporation, the following were measured: (i) the thickness of a film, (ii) thicknesses of respective coated portions of the positive electrode plate and the negative electrode plate, and (iii) thicknesses of non-coated portions of the positive electrode plate and the negative electrode plate. The thickness of an electrode active material layer was calculated by subtracting the thickness of a non-coated portion of each electrode plate from the thickness of a coated portion of the each electrode plate.

(2) Method of Calculating α Rate

In each of Examples and Comparative Examples below, a piece having a size of approximately 2 cm×5 cm was cut out from a laminated separator obtained. Then, an α-form PVDF-based resin content rate (α rate) of a PVDF-based resin contained in the laminated separator was measured according to the procedures (1) through (4) described in the previous section ("(Method of calculating α-form PVDF-based resin content rate and β-form PVDF-based resin content rate of PVDF-based resin)").

(3) Measurement of Capacitance of Electrode Plate

In each of Examples and Comparative Examples, capacitances of the obtained positive electrode plate and of the obtained negative electrode plate per measurement area of 900 $mm^2$ were each measured with use of an LCR meter (model number: IM3536) manufactured by Hioki E.E. Corporation. Measurement was performed at a frequency of 300 KHz while measurement conditions were set as follows: CV: 0.010 V, SPEED: SLOW2, AVG: 8, CABLE: 1 m, OPEN: All, SHORT: All DCBIAS 0.00 V. Respective absolute values of the capacitances thus measured were used as capacitances in each of Examples and Comparative Examples.

From an electrode plate which was a measurement target, a single piece was cut out so that the single piece had (i) a first portion which had a 3 cm×3 cm square shape and on which an electrode mix was disposed and (ii) a second portion which had a 1 cm×1 cm square shape and on which no electrode mix was disposed. To the second portion of the single piece thus cut out from the electrode plate, a lead wire having a length of 6 cm and a width of 0.5 cm was ultrasonically welded. This produced an electrode plate whose capacitance was to be measured (FIG. 1). An aluminum lead wire was used for the positive electrode plate, and a nickel lead wire was used for the negative electrode plate.

Figure 2:
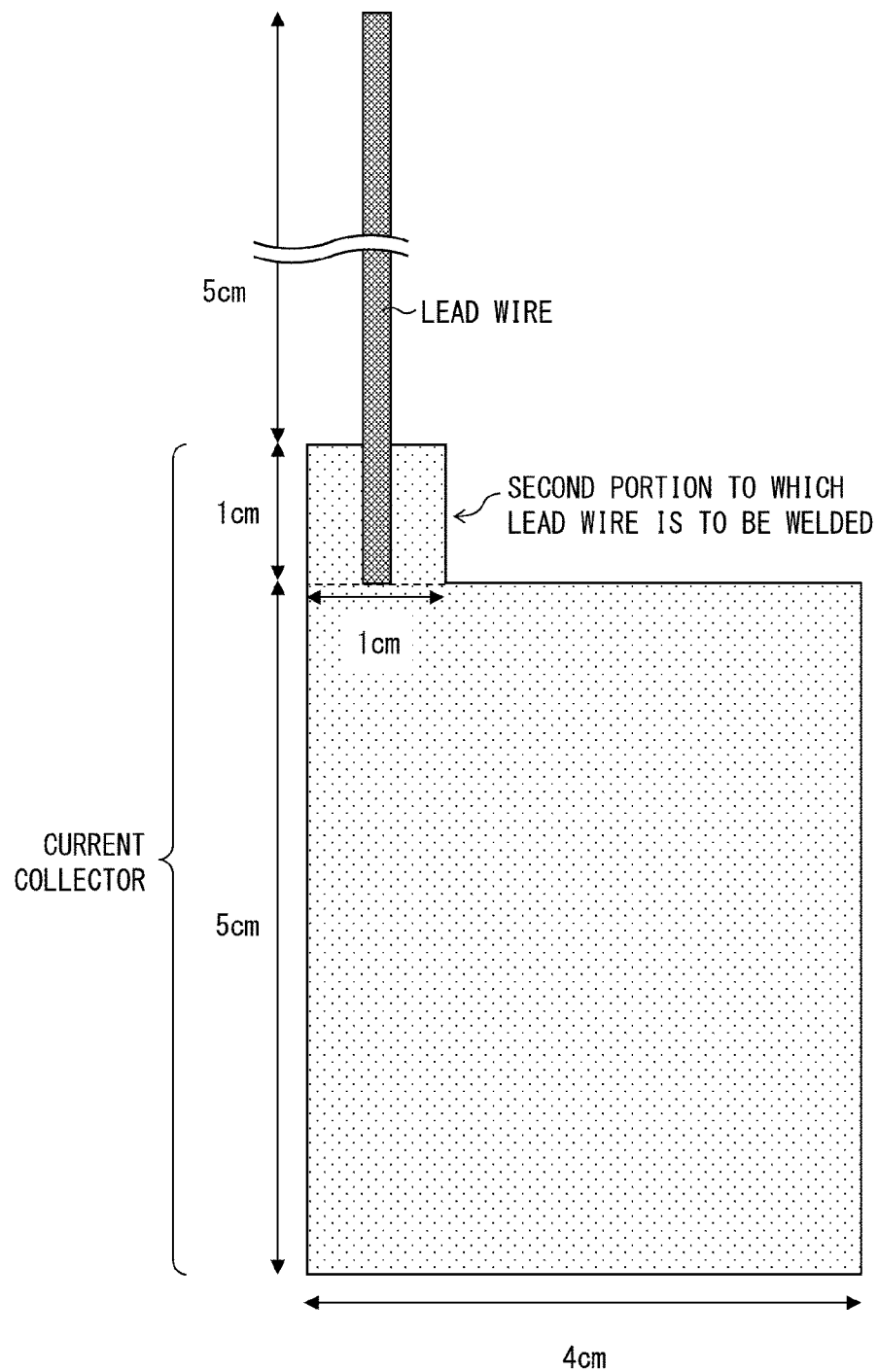
FIG. 2 is a view schematically illustrating a probe electrode which was used for measurement of the capacitance in Examples of the present application.

From a current collector, a single piece was cut out so that the single piece had (i) a first portion which had a 5 cm×4 cm rectangular shape and (ii) a second portion which had a 1 cm×1 cm square shape and to which a lead wire was to be welded. To the second portion of the single piece thus cut out from the current collector, a lead wire having a length of 6 cm and a width of 0.5 cm was ultrasonically welded. This produced a probe electrode (measurement electrode) (FIG. 2). An aluminum probe electrode having a thickness of 20 μm was used to measure the capacitance of the positive electrode plate, and a copper probe electrode having a thickness of 20 μm was used to measure the capacitance of the negative electrode plate.

The probe electrode was laid over the first portion (portion having a 3 cm×3 cm square shape) of the electrode plate, whose capacitance was to be measured. This produced a laminated body. The laminated body thus obtained was sandwiched between two sheets of silicon rubber. A resultant laminated body was further sandwiched between two SUS plates with a pressure of 0.7 MPa. This produced a laminated body which was to be subjected to the measurement. The lead wire of the electrode plate, whose capacitance was to be measured, and the lead wire of the probe electrode were drawn out of the laminated body which was to be subjected to the measurement. A voltage terminal and an electric current terminal of the LCR meter were each connected to those lead wires so that the voltage terminal was closer to the electrode plate than was the electric current terminal.

(4) Measurement of Porosity of Positive Electrode Active Material Layer

A porosity of a positive electrode active material layer included in a positive electrode plate in Example 1 below was measured by a method below. Porosities of positive electrode active material layers included in the positive electrode plates of the other Examples below were likewise measured.

A piece having a size of 14.5 $cm^2$ (4.5 cm×3 cm+1 cm×1 cm) was cut out from the positive electrode plate arranged such that a positive electrode mix (a mixture of $LiNi_{0.5}Mn_{0.3}Co_{0.2}O_2$, an electrically conductive agent, and PVDF (at a weight ratio of 92:5:3)) was disposed on one surface of a positive electrode current collector (aluminum foil). The piece of the positive electrode plate had a mass of 0.215 g and a thickness of 58 μm. A piece having the same size as the piece of the positive electrode plate was cut out from the positive electrode current collector. The piece of the positive electrode current collector thus out had a mass of 0.078 g and a thickness of 20 μm.

A density ρ of such a positive electrode active material layer was calculated as $(0.215-0.078)/\{(58-20)/10000\times 14.5\}=2.5$ g/cm$^3$.

Materials contained in the positive electrode mix had real densities as follows: the LiNi$_{0.5}$Mn$_{0.3}$Co$_{0.2}$O$_2$, the electrically conductive agent, and the PVDF had real densities of 4.68 g/cm$^3$, 1.8 g/cm$^3$, and 1.8 g/cm$^3$, respectively.

The positive electrode active material layer had a porosity ε of 40%, which was calculated with use of the above values according to the following formula:

$$\varepsilon=[1-\{2.5\times(92/100)/4.68+2.5\times(5/100)/1.8+2.5\times(3/100)/1.8\}]\times100=40\% \quad \text{(Formula)}.$$

(5) Measurement of Porosity of Negative Electrode Active Material Layer

A porosity of a negative electrode active material layer included in a negative electrode plate in Example 1 below was measured by a method below. Porosities of negative electrode active material layers included in the negative electrode plates of the other Examples below were likewise measured.

A piece having a size of 18.5 cm$^2$ (5 cm×3.5 cm+1 cm×1 cm) was cut out from a negative electrode plate arranged such that a negative electrode mix (a mixture of graphite, a styrene-1,3-butadiene copolymer, and sodium carboxymethyl cellulose (at a weight ratio of 98:1:1)) was disposed on one surface of a negative electrode current collector (copper foil). The piece thus cut out from the negative electrode plate had a mass of 0.266 g and a thickness of 48 μm. A piece having the same size as the piece of the negative electrode plate was cut out from the negative electrode current collector. The piece of the negative electrode current collector had a mass of 0.162 g and a thickness of 10 μm.

A density ρ of such a negative electrode active material layer was calculated as $(0.266-0.162)/\{(48-10)/10000\times 18.5\}=1.49$ g/cm$^3$.

Materials contained in the negative electrode mix had real densities as follows: the graphite, the styrene-1,3-butadiene copolymer, and the sodium carboxymethyl cellulose had real densities of 2.2 g/cm$^3$, 1 g/cm$^3$, and 1.6 g/cm$^3$, respectively.

The negative electrode active material layer had a porosity ε of 31%, which was calculated with use of the above values according to the following formula:

$$\varepsilon=[1-\{1.49\times(98/100)/2.2+1.49\times(1/100)/1+1.49\times(1/100)/1.6\}]\times100=31\% \quad \text{(Formula)}.$$

(6) Temperature Rise Ending Period in Case of Microwave Irradiation

In each of Examples and Comparative Examples below, an 8 cm×8 cm test piece was cut out from the porous film obtained, and the weight W (g) of the test piece was measured. Then, the weight per unit area of the test piece was calculated in accordance with the following formula:
Weight per unit area (g/m$^2$)=W/(0.08×0.08).

Then, the test piece was impregnated with N-methylpyrrolidone (NMP) containing water in an amount of 3% by weight. Then, the resultant test piece was spread out on a Teflon (registered trademark) sheet (size: 12 cm×10 cm) and then folded in half so as to sandwich an optical fiber thermometer ("Neoptix Reflex thermometer," manufactured by Astec Co., Ltd.) coated with polytetrafluoroethylene (PTFE).

Then, the resultant test piece, which had been impregnated with the water-containing NMP and in which the thermometer was sandwiched, was fixed in a microwave irradiation device including a turntable (9 kW microwave oven manufactured by Micro Denshi Co., Ltd. and having a frequency of 2455 MHz). Then, the test piece was irradiated with a microwave at 1800 W for two minutes. Note that the temperature of the surface of the film immediately before the microwave irradiation was adjusted to 29±1° C.

The atmospheric temperature in the device during the microwave irradiation was 27° C. to 30° C.

Then, a change in temperature of the test piece, which change occurred after the microwave irradiation was started, was measured at intervals of 0.2 seconds with use of the optical fiber thermometer. In the temperature measurement, (i) the temperature at which no temperature rise was observed for not less than 1 second was used as a temperature rise ending temperature and (ii) the time period between a time point at which the microwave irradiation was started and a time point at which the temperature rise ending temperature was reached was used as a temperature rise ending period. The temperature rise ending period thus obtained was divided by the above weight per unit area, so that a temperature rise ending period with respect to the amount of resin per unit area was calculated.

(7) After-Aging Battery Resistance (10 Hz Resistance)

(7-1) Aging

A new nonaqueous electrolyte secondary battery, which included a laminated separator produced in each of Examples and Comparative Example and which had not been subjected to any charge-discharge cycle, was subjected to four cycles of initial charge and discharge at 25° C. Each of the four cycles of the initial charge and discharge was carried out (i) at a voltage ranging from 2.7 V to 4.1 V, (ii) with CC-CV charge at a charge current value of 0.2 C (terminal current condition: 0.02 C) and (iii) with CC discharge at a discharge current value of 0.2 C. (Note that 1 C is an electric current value at which a battery rated capacity derived from a one-hour rate discharge capacity was discharged in one hour. This also applies to the following descriptions.) Note that "CC-CV charge" is a charging method in which a battery is charged at a constant electric current which has been set and, after a certain voltage is reached, the certain voltage is maintained while the electric current is being reduced. Note also that "CC discharge" is a discharging method in which a battery is discharged, until a certain voltage is reached, at a constant electric current which has been set.

(7-2) Measurement of after-Aging Battery Resistance (10 Hz Resistance)

To each nonaqueous electrolyte secondary battery prepared, a voltage having an amplitude of 10 mV was applied at room temperature (25° C.) with use of an LCR meter manufactured by Hioki E.E. Corporation (product name: chemical impedance meter, model 3532-80). This produced a Nyquist plot. The resistance value $R_{10\ Hz}$ of a real part of a measurement frequency of 10 kHz was read as the value of the after-aging battery resistance. Note that the battery resistance (10 Hz resistance) indicates a resistance of the entire battery.

Example 1

[Production of Nonaqueous Electrolyte Secondary Battery Laminated Separator]

Ultra-high molecular weight polyethylene powder (GUR4032, manufactured by Ticona Corporation) having a weight-average molecular weight of 4,970,000 and polyethylene wax (FNP-0115, manufactured by Nippon Seiro Co., Ltd.) having a weight-average molecular weight of 1,000 were mixed so that a resultant mixture would contain the ultra-high molecular weight polyethylene powder in an amount of 70% by weight and the polyethylene wax in an amount of 30% by weight. The total amount of the ultra-high molecular weight polyethylene powder and the polyethylene wax in the mixture was assumed to be 100 parts by weight. To the 100 parts by weight of the mixture, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate having an average particle size of 0.1 µm (manufactured by Maruo Calcium Co., Ltd.) was further added so as to account for 36% by volume of the entire volume of the resultant mixture. Then, while the resultant mixture was in the form of powder, the mixture was mixed in a Henschel mixer. Then, the mixture was melted and kneaded with use of a twin screw kneading extruder. This produced a polyolefin resin composition.

Then, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 0.5% by weight of a nonionic surfactant), so that the calcium carbonate was removed. Then, the sheet was stretched at a stretch ratio of 6.2 times, at a temperature of 100° C. to 105° C., and at a strain rate of 750% per minute. This produced a film having a thickness of 16.3 µm. Furthermore, the film was subjected to a heat-fixation treatment at 115° C. This produced a porous film 1.

An N-methyl-2-pyrrolidone (hereinafter referred to also as "NMP") solution (manufactured by Kureha Corporation; product name: L #9305, weight-average molecular weight: 1,000,000) containing a PVDF-based resin (polyvinylidene fluoride-hexafluoropropylene copolymer) was prepared as a coating solution 1. The coating solution 1 was applied by a doctor blade method to the porous film 1 so that the applied coating solution weighed 6.0 g per square meter of the PVDF-based resin in the coating solution.

The resultant coated product was immersed in 2-propanol while the coating film was wet with the solvent, and was then left to stand still at 25° C. for 5 minutes. This produced a laminated porous film 1. The laminated porous film 1 thus obtained was further immersed in another 2-propanol while the laminated porous film 1 was wet with the above immersion solvent, and was then left to stand still at 25° C. for 5 minutes. This produced a laminated porous film 1a. The laminated porous film 1a thus obtained was dried at 65° C. for 5 minutes. This produced a laminated separator 1. Table 1 shows the results of evaluation of the laminated separator 1 thus obtained.

[Preparation of Nonaqueous Electrolyte Secondary Battery]

(Preparation of Positive Electrode Plate)

A positive electrode plate, which was produced by coating an aluminum foil with $LiNi_{0.5}Mn_{0.3}Co_{0.2}O_2$/electrically conductive agent/PVDF (weight ratio 92:5:3), was used. The aluminum foil of the positive electrode plate was partially cut off so that (i) a positive electrode active material layer was present in an area of 45 mm×30 mm and (ii) the area was surrounded by an area which had a width of 13 mm and in which no positive electrode active material layer was present. A piece of the aluminum foil which was cut off was used as a positive electrode plate 1. The positive electrode active material layer had a thickness of 38 µm and a density of 2.50 g/cm³.

(Preparation of Negative Electrode Plate)

A negative electrode plate, which was produced by coating a copper foil with graphite/styrene-1,3-butadiene copolymer/sodium carboxymethyl cellulose (weight ratio 98:1:1), was used.

The copper foil of the negative electrode plate was partially cut off so that (i) a negative electrode active material layer was present in an area of 50 mm×35 mm and (ii) the area was surrounded by an area which had a width of 13 mm and in which area no negative electrode active material layer was present. A piece of the copper foil which was cut off was used as a negative electrode plate 1. The negative electrode active material layer had a thickness of 38 µm and a density of 1.49 g/cm³.

(Assembling of Nonaqueous Electrolyte Secondary Battery)

With use of the positive electrode plate 1, the negative electrode plate 1, and the laminated separator 1, a nonaqueous electrolyte secondary battery was prepared by the following method.

The positive electrode plate 1, the laminated separator 1, and the negative electrode plate 1 were disposed (arranged) in this order in a laminate pouch. This produced a nonaqueous electrolyte secondary battery member 1. In so doing, the positive electrode plate 1 and the negative electrode plate 1 were arranged so that a main surface of the positive electrode active material layer of the positive electrode plate 1 was entirely included in a range of a main surface of the negative electrode active material layer of the negative electrode plate 1 (i.e., entirely covered by the main surface of the negative electrode active material layer of the negative electrode plate 1).

Subsequently, the nonaqueous electrolyte secondary battery member 1 was put into a bag prepared, in advance, with an aluminum layer and a heat seal layer which were disposed on each other. Then, 0.25 mL of nonaqueous electrolyte was put into the bag. The nonaqueous electrolyte had been prepared by dissolving $LiPF_6$ in a mixed solvent in which ethylene carbonate, ethyl methyl carbonate, and diethyl carbonate were mixed at a ratio of 3:5:2 (volume ratio), so that a concentration of the $LiPF_6$ would become 1 mol/L. The bag was then heat-sealed while the pressure inside the bag was reduced. This produced a nonaqueous electrolyte secondary battery 1.

Then, an after-aging battery resistance (10 Hz resistance) of the nonaqueous electrolyte secondary battery 1 thus obtained by the above-described method was measured. Table 1 shows the results of the measurement.

Example 2

[Production of Nonaqueous Electrolyte Secondary Battery Laminated Separator]

Ultra-high molecular weight polyethylene powder (GUR4032, manufactured by Ticona Corporation) having a weight-average molecular weight of 4,970,000 and polyethylene wax (FNP-0115, manufactured by Nippon Seiro Co., Ltd.) having a weight-average molecular weight of 1,000 were mixed so that a resultant mixture would contain the ultra-high molecular weight polyethylene powder in an amount of 70% by weight and the polyethylene wax in an amount of 30% by weight. The total amount of the ultra-high molecular weight polyethylene powder and the polyethylene wax in the mixture was assumed to be 100 parts by weight. To the 100 parts by weight of the mixture, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate having an average particle size of 0.1 μm (manufactured by Maruo Calcium Co., Ltd.) was further added so as to account for 36% by volume of the entire volume of the resultant mixture. Then, while the resultant mixture was in the form of powder, the mixture was mixed in a Henschel mixer. Then, the mixture was melted and kneaded with use of a twin screw kneading extruder. This produced a polyolefin resin composition.

Then, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 0.5% by weight of a nonionic surfactant), so that the calcium carbonate was removed. Then, the sheet was stretched at a stretch ratio of 6.2 times, at a temperature of 100° C. to 105° C., and at a strain rate of 1250% per minute. This produced a film having a thickness of 15.5 μm. Furthermore, the film was subjected to a heat-fixation treatment at 120° C. This produced a porous film 2.

As in Example 1, the porous film 2 was coated with the coating solution 1. The resultant coated product was immersed in 2-propanol while the coating film was wet with the solvent, and was then left to stand still at −10° C. for 5 minutes. This produced a laminated porous film 2. The laminated porous film 2 thus obtained was further immersed in another 2-propanol while the laminated porous film 2 was wet with the above immersion solvent, and was then left to stand still at 25° C. for 5 minutes. This produced a laminated porous film 2a. The laminated porous film 2a thus obtained was dried at 30° C. for 5 minutes. This produced a laminated separator 2. Table 1 shows the results of evaluation of the laminated separator 2 thus obtained.

[Preparation of Nonaqueous Electrolyte Secondary Battery]

A nonaqueous electrolyte secondary battery was prepared as in Example 1 except that the laminated separator 2 was used instead of the laminated separator 1. The nonaqueous electrolyte secondary battery thus prepared was used as a nonaqueous electrolyte secondary battery 2.

Then, an after-aging battery resistance (10 Hz resistance) of the nonaqueous electrolyte secondary battery thus obtained by the above-described method was measured. Table 1 shows the results of the measurement.

Example 3

[Production of Nonaqueous Electrolyte Secondary Battery Laminated Separator]

Ultra-high molecular weight polyethylene powder (GUR4032, manufactured by Ticona Corporation) having a weight-average molecular weight of 4,970,000 and polyethylene wax (FNP-0115, manufactured by Nippon Seiro Co., Ltd.) having a weight-average molecular weight of 1,000 were mixed so that a resultant mixture would contain the ultra-high molecular weight polyethylene powder in an amount of 71% by weight and the polyethylene wax in an amount of 29% by weight. The total amount of the ultra-high molecular weight polyethylene powder and the polyethylene wax in the mixture was assumed to be 100 parts by weight. To the 100 parts by weight of the mixture, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate having an average particle size of 0.1 μm (manufactured by Maruo Calcium Co., Ltd.) was further added so as to account for 37% by volume of the entire volume of the resultant mixture. Then, while the resultant mixture was in the form of powder, the mixture was mixed in a Henschel mixer. Then, the mixture was melted and kneaded with use of a twin screw kneading extruder. This produced a polyolefin resin composition.

Then, the polyolefin resin composition was rolled with use of a pair of rollers each having a surface temperature of 150° C. This produced a sheet of the polyolefin resin composition. The sheet thus produced was immersed in a hydrochloric acid aqueous solution (containing 4 mol/L of hydrochloric acid, 0.5% by weight of a nonionic surfactant), so that the calcium carbonate was removed. Then, the sheet was stretched at a stretch ratio of 7.0 times, at a temperature of 100° C. to 105° C., and at a strain rate of 2100% per minute. This produced a film having a thickness of 11.7 μm. Furthermore, the film was subjected to a heat-fixation treatment at 123° C. This produced a porous film 3.

As in Example 1, the porous film 3 was coated with the coating solution 1. The resultant coated product was immersed in 2-propanol while the coating film was wet with the solvent, and was then left to stand still at −5° C. for 5 minutes. This produced a laminated porous film 3. The laminated porous film 3 thus obtained was further immersed in another 2-propanol while the laminated porous film 3 was wet with the above immersion solvent, and was then left to stand still at 25° C. for 5 minutes. This produced a laminated porous film 3a. The laminated porous film 3a thus obtained was dried at 30° C. for 5 minutes. This produced a laminated separator 3. Table 1 shows the results of evaluation of the laminated separator 3 thus obtained.

[Preparation of Nonaqueous Electrolyte Secondary Battery]

A nonaqueous electrolyte secondary battery was prepared as in Example 1 except that the laminated separator 3 was used instead of the laminated separator 1. The nonaqueous electrolyte secondary battery thus prepared was used as a nonaqueous electrolyte secondary battery 3.

Then, an after-aging battery resistance (10 Hz resistance) of the nonaqueous electrolyte secondary battery 3 thus obtained by the above-described method was measured. Table 1 shows the results of the measurement.

Example 4

(Preparation of Positive Electrode Plate)

A surface of a positive electrode plate, identical to the positive electrode plate 1, which surface was located on a positive electrode active material layer side was rubbed 3 times with use of an abrasive cloth sheet (model number: TYPE AA GRIT No. 100) manufactured by Nagatsuka Abrasive Mfg. Co., Ltd. This produced a positive electrode plate 2. A positive electrode active material layer of the positive electrode plate 2 had a thickness of 38 μm and a porosity of 40%.

[Preparation of Nonaqueous Electrolyte Secondary Battery]

The negative electrode plate 1 was used as a negative electrode plate. A nonaqueous electrolyte secondary battery was prepared as in Example 1 except that (i) the laminated separator 3 was used instead of the laminated separator 1 and (ii) the positive electrode plate 2 was used as a positive electrode plate. The nonaqueous electrolyte secondary battery thus prepared was used as a nonaqueous electrolyte secondary battery 4.

Then, an after-aging battery resistance (10 Hz resistance) of the nonaqueous electrolyte secondary battery 4 thus obtained by the above-described method was measured. Table 1 shows the results of the measurement.

Example 5

(Preparation of Positive Electrode Plate)

A surface of a positive electrode plate, identical to the positive electrode plate 1, which surface was located on a positive electrode active material layer side was rubbed 5 times with use of an abrasive cloth sheet (model number: TYPE AA GRIT No. 100) manufactured by Nagatsuka Abrasive Mfg. Co., Ltd. This produced a positive electrode plate 3. A positive electrode active material layer of the positive electrode plate 3 had a thickness of 38 μm and a porosity of 40%.

[Preparation of Nonaqueous Electrolyte Secondary Battery]

The negative electrode plate 1 was used as a negative electrode plate. A nonaqueous electrolyte secondary battery was prepared as in Example 1 except that (i) the laminated separator 3 was used instead of the laminated separator 1 and (ii) the positive electrode plate 3 was used as a positive electrode plate. The nonaqueous electrolyte secondary battery thus prepared was used as a nonaqueous electrolyte secondary battery 5.

Then, an after-aging battery resistance (10 Hz resistance) of the nonaqueous electrolyte secondary battery thus obtained by the above-described method was measured. Table 1 shows the results of the measurement.

Example 6

(Preparation of Negative Electrode Plate)

A surface of a negative electrode plate, identical to the negative electrode plate 1, which surface was located on a negative electrode active material layer side was rubbed 3 times with use of an abrasive cloth sheet (model number: TYPE AA GRIT No. 100) manufactured by Nagatsuka Abrasive Mfg. Co., Ltd. This produced a negative electrode plate 2. The negative electrode active material layer of the negative electrode plate 2 had a thickness of 38 μm and a porosity of 31%.

[Preparation of Nonaqueous Electrolyte Secondary Battery]

The positive electrode plate 1 was used as a positive electrode plate. A nonaqueous electrolyte secondary battery was prepared as in Example 1 except that (i) the laminated separator 3 was used instead of the laminated separator 1 and (ii) the negative electrode plate 2 was used as a negative electrode plate. The nonaqueous electrolyte secondary battery thus prepared was used as a nonaqueous electrolyte secondary battery 6.

Then, an after-aging battery resistance (10 Hz resistance) of the nonaqueous electrolyte secondary battery thus obtained by the above-described method was measured. Table 1 shows the results of the measurement.

Example 7

(Preparation of Negative Electrode Plate)

A surface of a negative electrode plate, identical to the negative electrode plate 1, which surface was located on a negative electrode active material layer side was rubbed 7 times with use of an abrasive cloth sheet (model number: TYPE AA GRIT No. 100) manufactured by Nagatsuka Abrasive Mfg. Co., Ltd. This produced a negative electrode plate 3. The negative electrode active material layer of the negative electrode plate 3 had a thickness of 38 μm and a porosity of 31%.

[Preparation of Nonaqueous Electrolyte Secondary Battery]

The positive electrode plate 1 was used as a positive electrode plate. A nonaqueous electrolyte secondary battery was prepared as in Example 1 except that (i) the laminated separator 3 was used instead of the laminated separator 1 and (ii) the negative electrode plate 3 was used as a negative electrode plate. The nonaqueous electrolyte secondary battery thus prepared was used as a nonaqueous electrolyte secondary battery 7.

Then, an after-aging battery resistance (10 Hz resistance) of the nonaqueous electrolyte secondary battery 7 thus obtained by the above-described method was measured. Table 1 shows the results of the measurement.

Example 8

[Preparation of Porous Layer and Laminated Separator]

In N-methyl-2-pyrrolidone, a PVDF-based resin (manufactured by Arkema Inc.; product name "Kynar LBG"; weight-average molecular weight of 590,000) was stirred and dissolved at 65° C. for 30 minutes so that a solid content would account for 10% by mass. A resultant solution was used as a binder solution. As a filler, alumina fine particles (manufactured by Sumitomo Chemical Co., Ltd.; product name "AKP3000"; silicon content: 5 ppm) was used. The alumina fine particles, the binder solution, and a solvent (N-methyl-2-pyrrolidone) were mixed together in the following proportion. That is, the alumina fine particles, the binder solution, and the solvent were mixed together so that (i) a resultant mixed solution would contain 10 parts by weight of the PVDF-based resin with respect to 90 parts by weight of the alumina fine particles and (ii) a solid content concentration (alumina fine particles+PVDF-based resin) of the mixed solution would account for 10% by weight. This produced a dispersion liquid. The dispersion liquid was applied by a doctor blade method to the porous film 3 prepared in Example 3, so that the PVDF-based resin in the dispersion liquid weighed 6.0 g per square meter. This produced a laminated porous film 4. The laminated porous film 4 was dried at 65° C. for 5 minutes. This produced a laminated separator 4. The laminated porous film 4 was dried such that (i) the direction of the hot air was perpendicular to the base material and (ii) the velocity of the hot air was 0.5 m/s. Table 1 shows the results of evaluation of the laminated separator 4 thus obtained.

[Preparation of Nonaqueous Electrolyte Secondary Battery]

A nonaqueous electrolyte secondary battery was prepared as in Example 1 except that the laminated separator 4 was used instead of the laminated separator 1. The nonaqueous electrolyte secondary battery thus prepared was used as a nonaqueous electrolyte secondary battery 8.

Then, an after-aging battery resistance (10 Hz resistance) of the nonaqueous electrolyte secondary battery 8 thus obtained by the above-described method was measured. Table 1 shows the results of the measurement.

Comparative Example 1

(Preparation of Positive Electrode Plate)

A surface of a positive electrode plate, identical to the positive electrode plate 1, which surface was located on a positive electrode active material layer side was rubbed 10 times with use of an abrasive cloth sheet (model number: TYPE AA GRIT No. 100) manufactured by Nagatsuka Abrasive Mfg. Co., Ltd. This produced a positive electrode plate 4. A positive electrode active material layer of the positive electrode plate 4 had a thickness of 38 μm and a porosity of 40%.

[Preparation of Nonaqueous Electrolyte Secondary Battery]

The negative electrode plate 1 was used as a negative electrode plate. A nonaqueous electrolyte secondary battery was prepared as in Example 1 except that (i) the laminated separator 3 was used as a nonaqueous electrolyte secondary battery laminated separator and (ii) the positive electrode plate 4 was used as a positive electrode plate. The nonaqueous electrolyte secondary battery thus obtained was used as a nonaqueous electrolyte secondary battery 9.

Then, an after-aging battery resistance (10 Hz resistance) of the nonaqueous electrolyte secondary battery thus obtained by the above-described method was measured. Table 1 shows the results of the measurement.

Comparative Example 2

(Preparation of Negative Electrode Plate)

A surface of a negative electrode plate, identical to the negative electrode plate 1, which surface was located on a negative electrode active material layer side was rubbed 10 times with use of an abrasive cloth sheet (model number: TYPE AA GRIT No. 100) manufactured by Nagatsuka Abrasive Mfg. Co., Ltd. This produced a negative electrode plate 4. The negative electrode active material layer of the negative electrode plate 4 had a thickness of 38 μm and a porosity of 31%.

[Preparation of Nonaqueous Electrolyte Secondary Battery]

The positive electrode plate 1 was used as a positive electrode plate. A nonaqueous electrolyte secondary battery was prepared as in Example 1 except that (i) the laminated separator 3 was used as a nonaqueous electrolyte secondary battery laminated separator and (ii) the negative electrode plate 4 was used as a negative electrode plate. The nonaqueous electrolyte secondary battery thus obtained was used as a nonaqueous electrolyte secondary battery 10.

Then, an after-aging battery resistance (10 Hz resistance) of the nonaqueous electrolyte secondary battery 10 thus obtained by the above-described method was measured. Table 1 shows the results of the measurement.

Comparative Example 3

[Preparation of Nonaqueous Electrolyte Secondary Battery Laminated Separator]

A coated product obtained as in Example 3 was immersed in 2-propanol while the coating film was wet with the solvent, and was then left to stand still at −78° C. for 5 minutes. This produced a laminated porous film 5. The laminated porous film 5 thus obtained was further immersed in another 2-propanol while the laminated porous film 5 was wet with the above immersion solvent, and was then left to stand still at 25° C. for 5 minutes. This produced a laminated porous film 5a. The laminated porous film 5a thus produced was dried at 30° C. for 5 minutes. This produced a laminated separator 5. Table 1 shows the results of evaluation of the laminated separator 5 thus obtained.

[Preparation of Nonaqueous Electrolyte Secondary Battery]

A nonaqueous electrolyte secondary battery was prepared as in Example 1 except that the laminated separator 5 was used as a nonaqueous electrolyte secondary battery laminated separator. The nonaqueous electrolyte secondary battery thus obtained was used as a nonaqueous electrolyte secondary battery 11.

Then, an after-aging battery resistance (10 Hz resistance) of the nonaqueous electrolyte secondary battery 11 thus obtained by the above-described method was measured. Table 1 shows the results of the measurement.

TABLE 1

| | Laminated separator | | Electrode | | Battery After-aging |
|---|---|---|---|---|---|
| | Base material Diminution rate (sec · m$^2$/g) | Coated layer PVDF α rate (mol %) | Positive electrode Capacitance (nF) | Negative electrode Capacitance (nF) | battery resistance (10 Hz resistance) (Ω) |
| Example 1 | 5.62 | 80.8 | 2.1 | 4.7 | 1.00 |
| Example 2 | 2.99 | 35.3 | 2.1 | 4.7 | 1.03 |
| Example 3 | 5.26 | 44.4 | 2.1 | 4.7 | 0.98 |
| Example 4 | 5.26 | 44.4 | 60 | 4.7 | 0.92 |
| Example 5 | 5.26 | 44.4 | 935 | 4.7 | 1.09 |
| Example 6 | 5.26 | 44.4 | 2.1 | 274 | 0.97 |
| Example 7 | 5.26 | 44.4 | 2.1 | 7400 | 0.94 |
| Example 8 | 5.26 | 64.3 | 2.1 | 4.7 | 1.05 |
| Comparative Example 1 | 5.26 | 44.4 | 4090 | 4.7 | 1.73 |
| Comparative Example 2 | 5.26 | 44.4 | 2.1 | 9050 | 1.70 |
| Comparative Example 3 | 5.26 | 34.6 | 2.1 | 4.7 | 1.71 |

As shown in Table 1, the nonaqueous electrolyte secondary batteries produced in Examples 1 through 8 each had a characteristic of an after-aging battery resistance (10 Hz resistance) superior to those of the nonaqueous electrolyte secondary batteries produced in Comparative Examples 1 through 3.

Specifically, it was found that a characteristic of an after-aging battery resistance (10 Hz resistance) of a nonaqueous electrolyte secondary battery can be improved by causing the nonaqueous electrolyte secondary battery to satisfy the following 4 requirements (i) through (iv): (i) a polyvinylidene fluoride-based resin contained in a porous layer contains an α-form polyvinylidene fluoride-based resin in an amount of not less than 35.0 mol % with respect to 100 mol % of a total amount of (i) the α-form polyvinylidene fluoride-based resin and (ii) a β-form polyvinylidene fluoride-based resin contained in the polyvinylidene fluoride-based resin, (ii) a porous film has a temperature rise ending period of 2.9 sec·m$^2$/g to 5.7 sec·m$^2$/g with respect to an amount of a resin per unit area in a case where the porous film is (a) impregnated with N-methylpyrrolidone containing water in an amount of 3% by weight and then (b) irradiated, at an output of 1,800 W, with a microwave having a frequency of 2,455 MHz, (iii) a positive electrode plate has a capacitance of 1 nF to 1000 nF per measurement area of 900 mm$^2$, and (iv) a negative electrode plate has a capacitance of 4 nF to 8500 nF per measurement area of 900 mm$^2$.

INDUSTRIAL APPLICABILITY

A nonaqueous electrolyte secondary battery in accordance with an embodiment of the present invention is excellent in a characteristic of an after-aging battery resistance (10 Hz resistance). It is therefore possible to suitably use the nonaqueous electrolyte secondary battery as a battery for, for example, a personal computer, a mobile phone, a mobile information terminal, and a vehicle.

The invention claimed is:

1. A nonaqueous electrolyte secondary battery comprising:
    a nonaqueous electrolyte secondary battery separator containing a polyolefin porous film;
    a porous layer containing a polyvinylidene fluoride-based resin;
    a positive electrode plate having a capacitance of 1 nF to 1000 nF per measurement area of 900 mm$^2$; and
    a negative electrode plate having a capacitance of 4 nF to 8500 nF per measurement area of 900 mm$^2$,
    the polyolefin porous film having a temperature rise ending period of 2.9 sec·m$^2$/g to 5.7 sec·m$^2$/g with respect to an amount of a resin per unit area in a case where the polyolefin porous film is (i) impregnated with N-methylpyrrolidone containing water in an amount of 3% by weight and then (ii) irradiated, at an output of 1,800 W, with a microwave having a frequency of 2,455 MHz,
    the porous layer being provided between the nonaqueous electrolyte secondary battery separator and at least one of the positive electrode plate and the negative electrode plate, and
    the polyvinylidene fluoride-based resin containing an α-form polyvinylidene fluoride-based resin in an amount of not less than 35.0 mol % with respect to 100 mol % of a total amount of (i) the α-form polyvinylidene fluoride-based resin and (ii) a β-form polyvinylidene fluoride-based resin contained in the polyvinylidene fluoride-based resin,
    where the amount of the α-form polyvinylidene fluoride-based resin contained is calculated from (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

2. The nonaqueous electrolyte secondary battery as set forth in claim 1, wherein the positive electrode plate contains a transition metal oxide.

3. The nonaqueous electrolyte secondary battery as set forth in claim 1, wherein the negative electrode plate contains graphite.

4. The nonaqueous electrolyte secondary battery as set forth in claim 1, further comprising:
    another porous layer which is provided between (i) the nonaqueous electrolyte secondary battery separator and (ii) at least one of the positive electrode plate and the negative electrode plate.

5. The nonaqueous electrolyte secondary battery as set forth in claim 4, wherein the another porous layer contains at least one resin selected from the group consisting of a polyolefin, a meth acrylate-based resin, an acrylate-based resin, a fluorine-containing resin excluding a polyvinylidene fluoride-based resin, a polyamide-based resin, a polyester-based resin, and a water-soluble polymer.

6. The nonaqueous electrolyte secondary battery as set forth in claim 5, wherein the polyamide-based resin is an aramid resin.

* * * * *